Feb. 16, 1971 C. C. PERKINS ET AL 3,564,509
DATA PROCESSING APPARATUS
Filed April 22, 1968 18 Sheets-Sheet 1
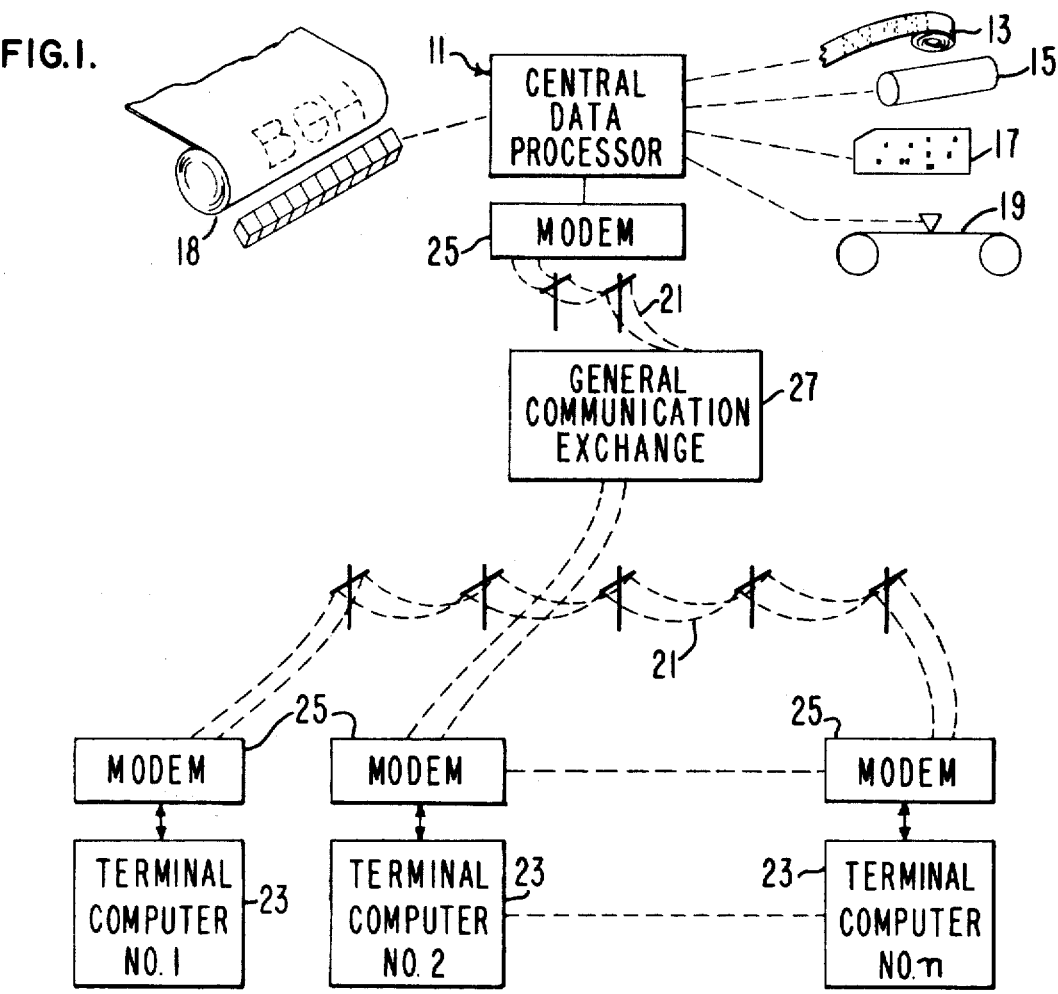
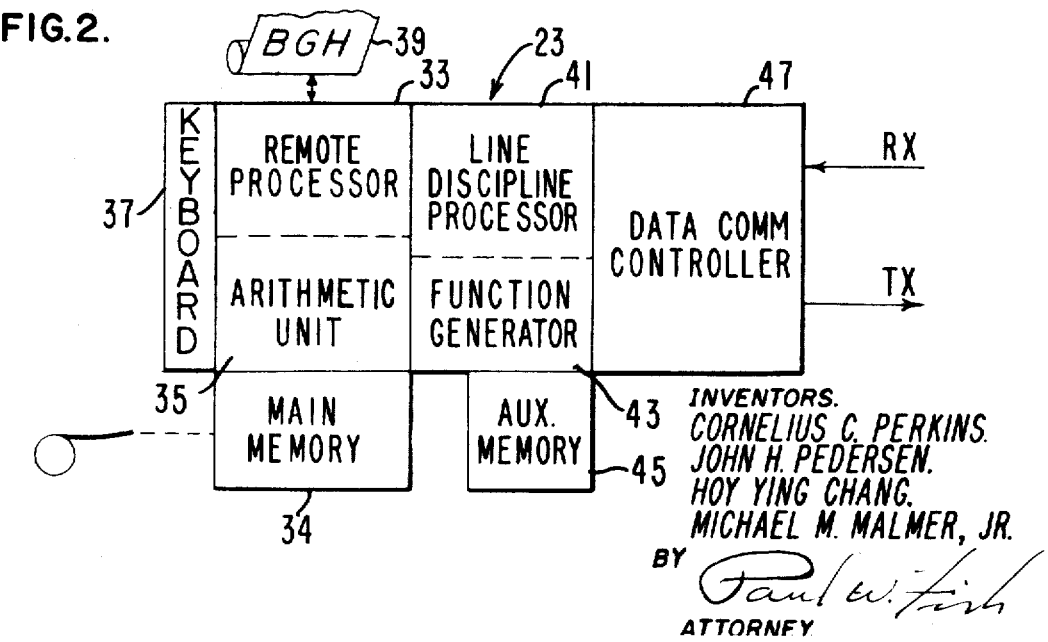
INVENTORS.
CORNELIUS C. PERKINS.
JOHN H. PEDERSEN.
HOY YING CHANG.
MICHAEL M. MALMER, JR.
BY Paul W. Fish
ATTORNEY 4 BIT MICRO ADDRESS SEARCH = $E_5$
7 BIT MICRO ADDRESS SEARCH = $E_4$
LOAD U UPPER = $(E_4+E_5) \cdot TA2F$
LOAD U LOWER = $E_2$
CHARACTER ADDRESS SEARCH = $E_3 \cdot UAC$
WORD ADDRESS SEARCH = $E_7$
EXECUTE = $E_1$
HEAD SWITCHING = $E_0$ OR $E_7$
$E_0 \geq 67$ BITS    DATA TO MICRO
$E_7 \geq 67$ BITS    MICRO TO DATA

LEGEND.
· = AND
+ = OR
/ = NOT

FIG. 6A.

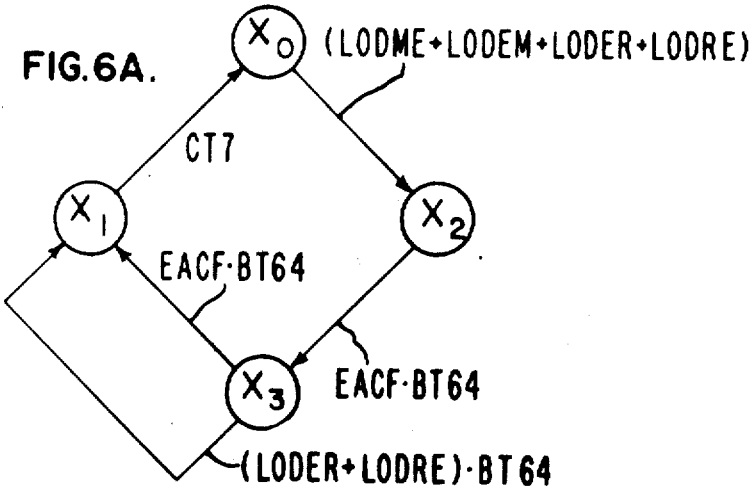

FIG. 6B.

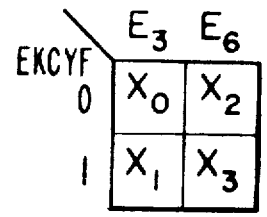

FIG. 6C.

$SY13X_1/ = \overline{(LODME+LODEM+LODRE+LODER) \cdot X_0 \cdot BT63}$ $SY24X_1/ = \overline{X_1 + X_3 \cdot LODER \cdot BT63}$ $URMR/ = \overline{(LODME+LODEM) \cdot CT4}$ —— { SETS HSF TO SELECT M.M. DATA HEADS IN $M_2$.

$HC1 = \overline{BDOF/ \cdot (LODME+LODEM) \cdot TMS23}$ } SELECT M.M. BLOCK
$HC2 = \overline{BDIF/ \cdot (LODME+LODEM) \cdot TMS23}$ } M.M. TRACKS SELECTED AUTOMATICALLY.

$LC1/ = \overline{LODEM+LODME+LODER}$ —— ENABLES KSUM INTO R-LOOP $K12X_1/ = \overline{(MRF \cdot A \cdot LODME + ERF(LODEM+LODER)) \cdot TMS23}$ $MRWC/ = \overline{LODEM \cdot X_3}$ —————— R → M

E WORD SEARCH = LODRE + LODER
  (FOR LODME, LODEM, WORD 0 IS SEARCHED FOR)

E TRACK SELECT = $(LODEM+LODME+LODER+LODRE) \cdot TMS23 + X_2 + X_3$

R → E  = $X_3 (LODME + LODRE)$ $X_2 + X_3 + X_1 + X_0 \cdot TMS2$ = M.M. HEAD SELECT
$X_2$ = PRE-LOAD R-LOOP
$X_3$ = R → M OR E
$TMS23$ = M OR E → R

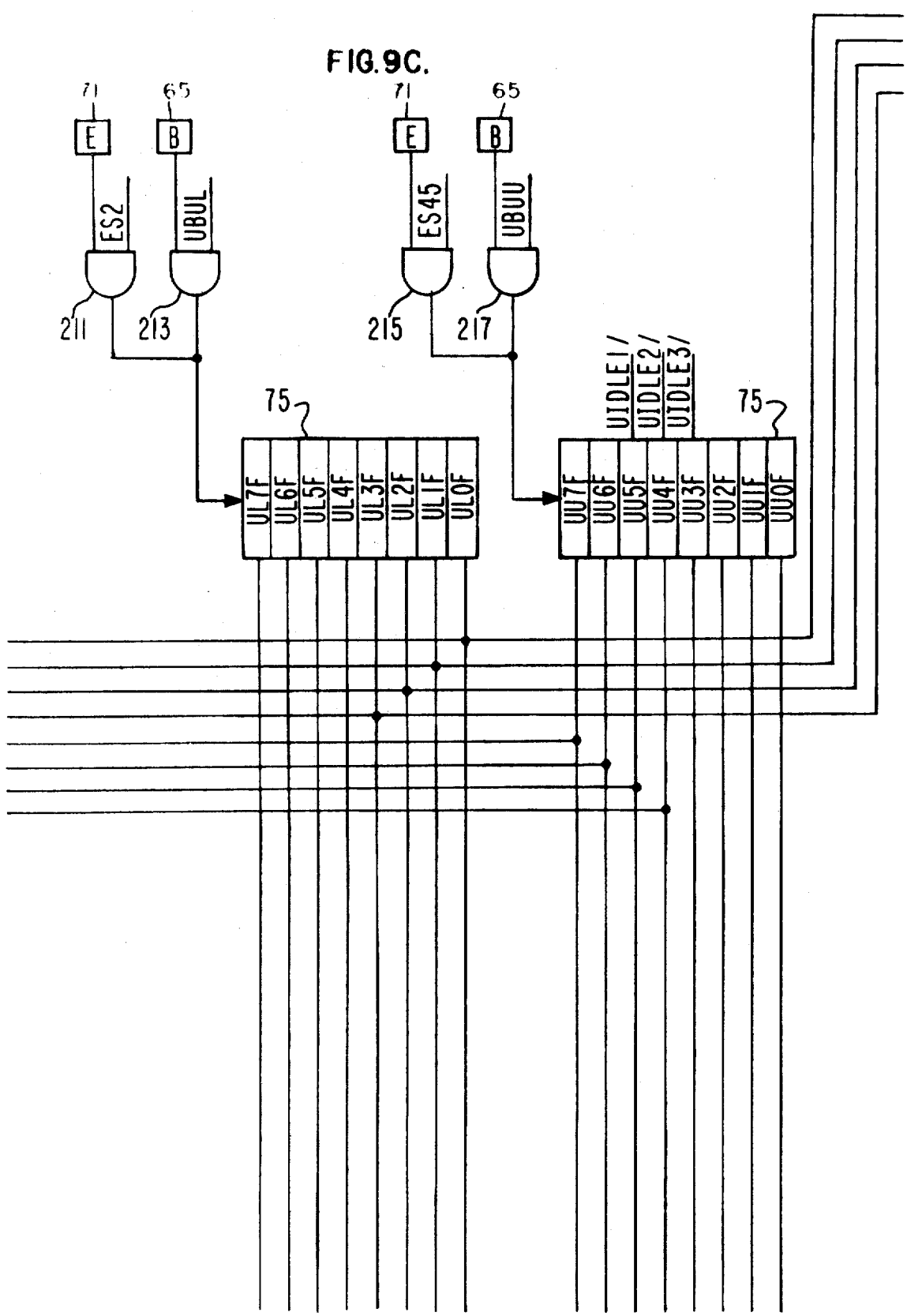

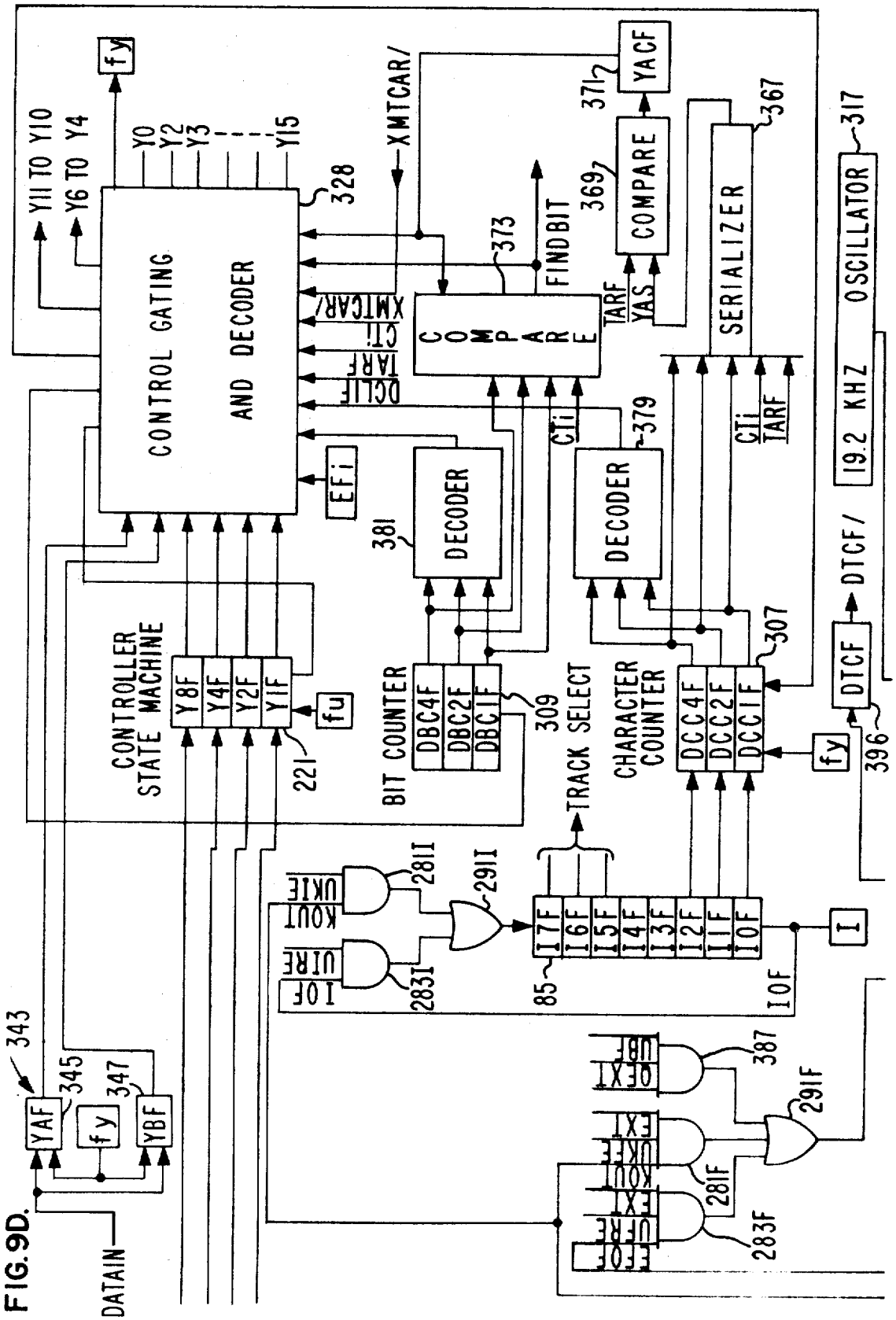

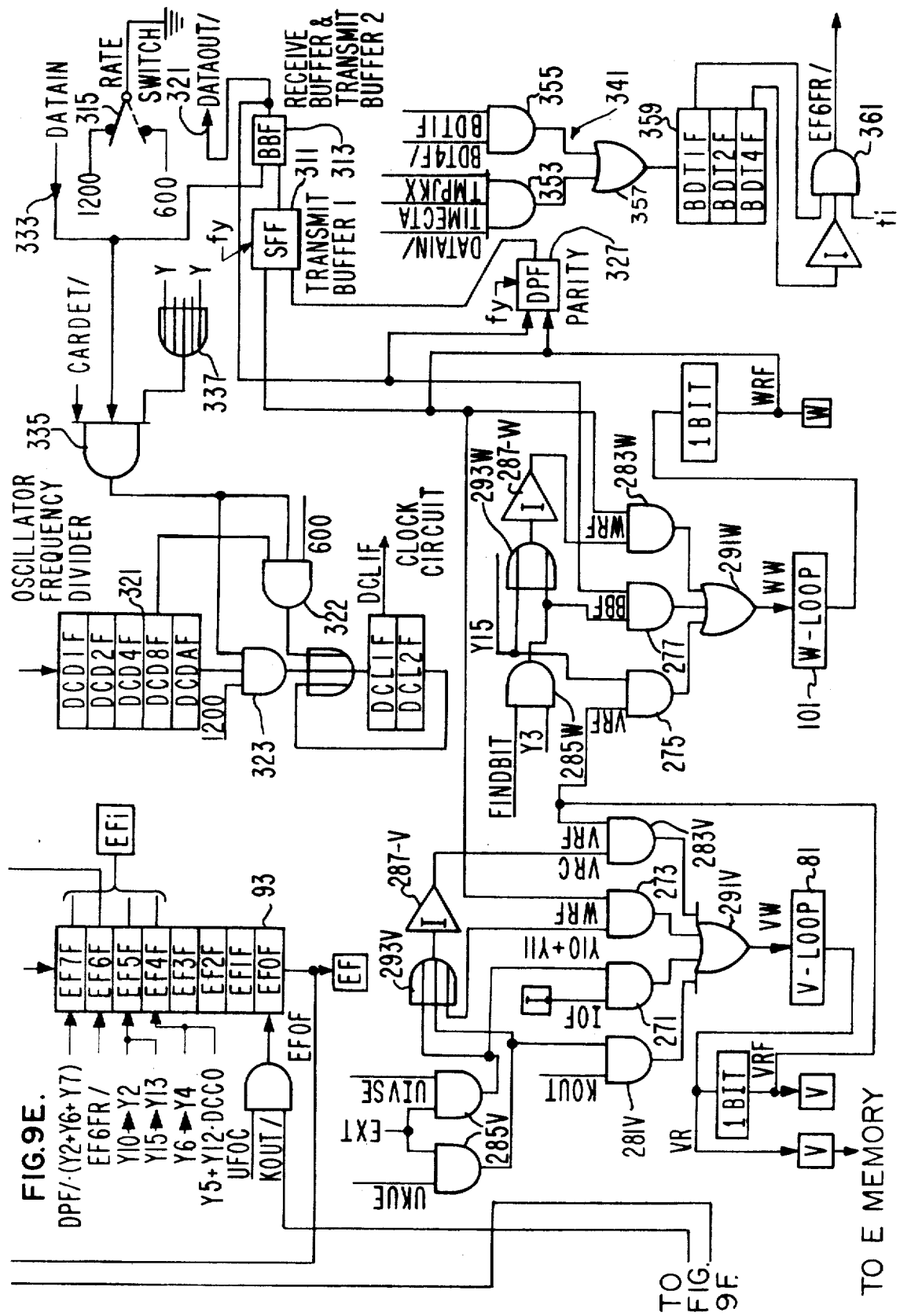

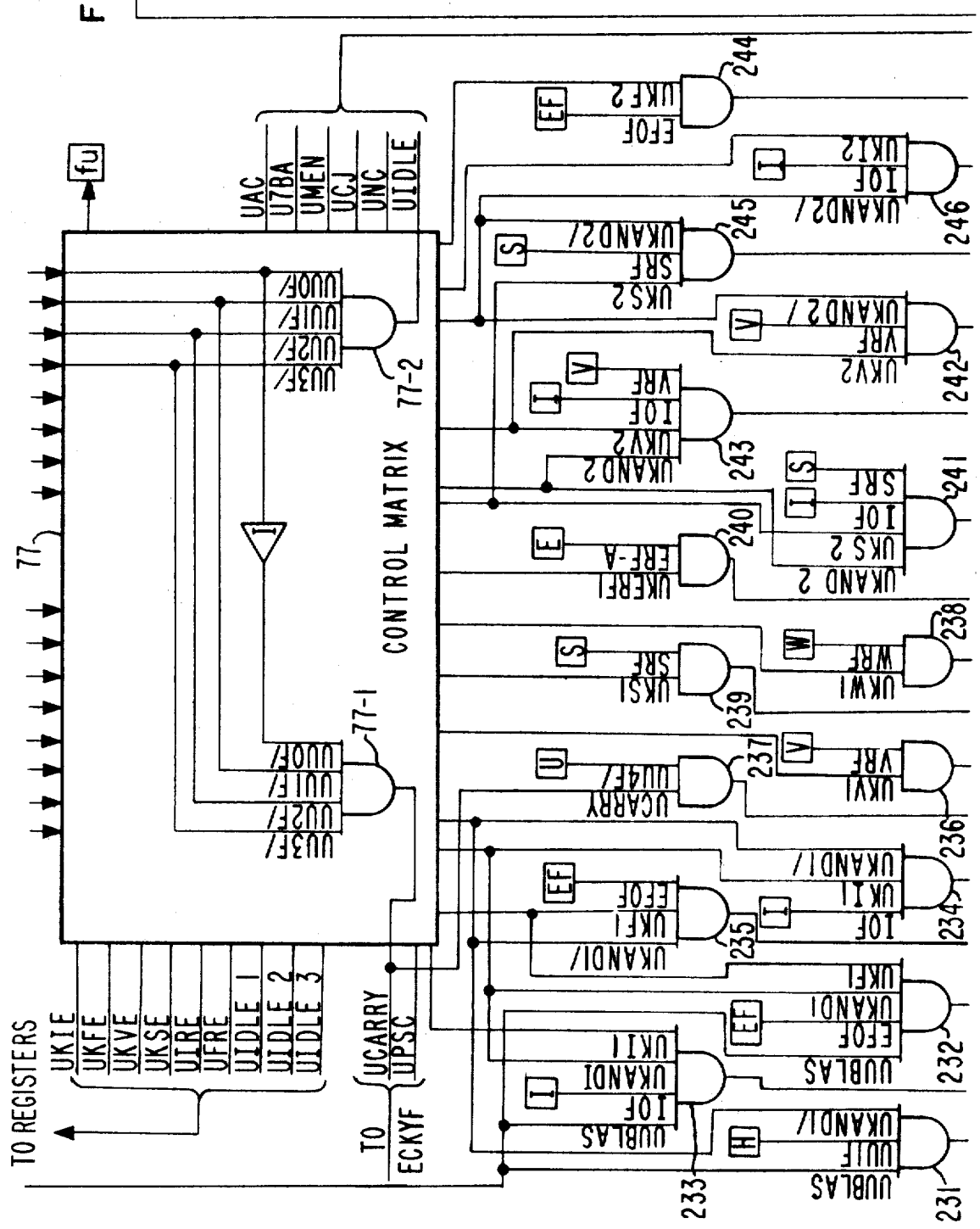

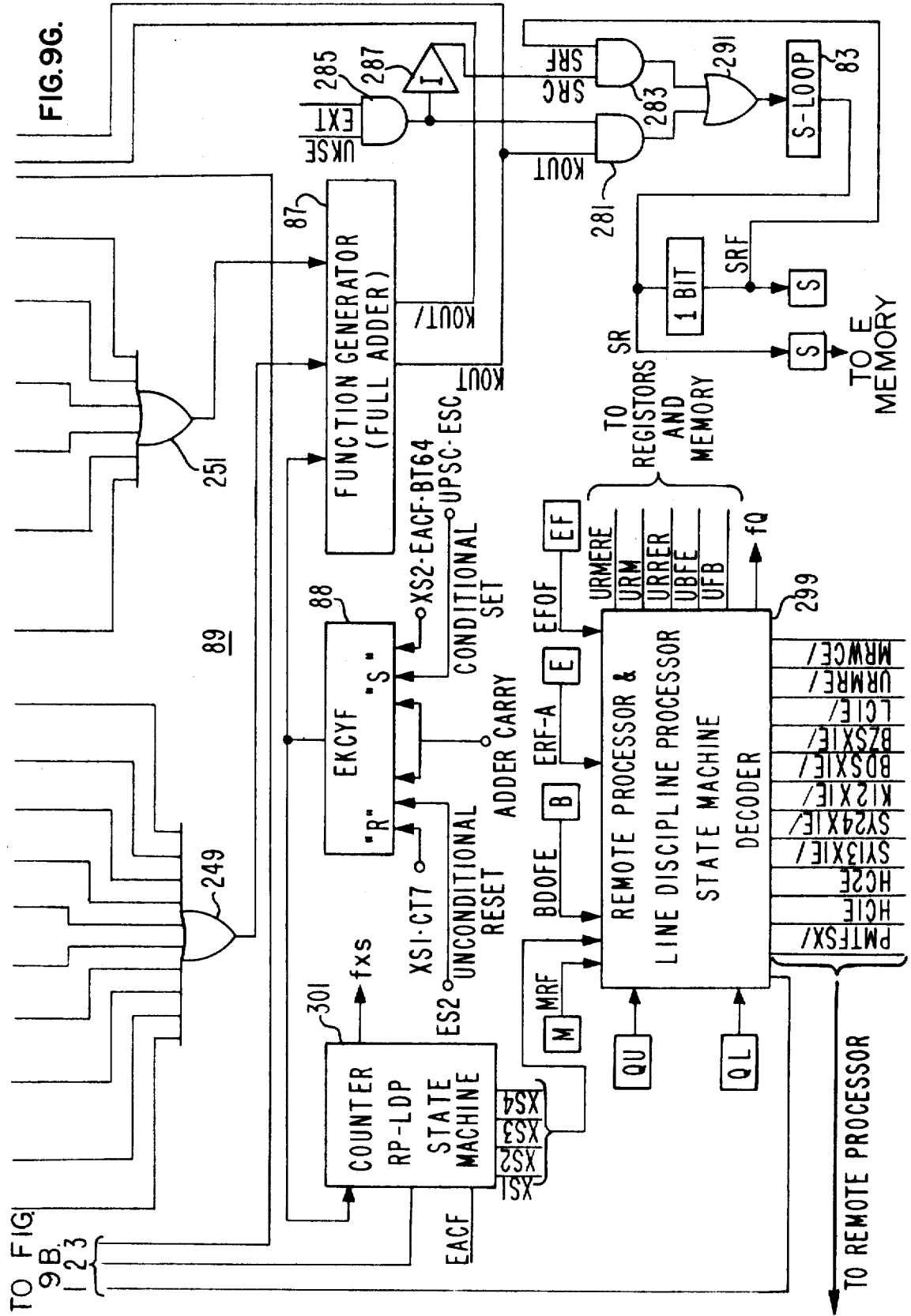

POLL, ACKNOWLEDGEMENT, TRANSMISSION AND ACKNOWLEDGEMENT

POLL WITH NEGATIVE ACKNOWLEDGEMENT

SELECTION, ACKNOWLEDGEMENT, MESSAGE RECEIPT AND ACKNOWLEDGEMENT

SELECTION WITH NEGATIVE ACKNOWLEDGEMENT

LEGEND

FUNCTION

MESSAGE
FORMAT
1 2 3 .....

FIG. 12.

| | FLIP-FLOP DESIGNATION | | | | | | | |
|---|---|---|---|---|---|---|---|---|
| | EF7F | EF6F | EF5F | EF4F | EF3F | EF2F | EF1F | EF0F |
| SET BY HW | INPUT CHARACTER PARITY ERROR DURING RECEIVE MODE | | V LOADED WITH 8 RECEIVED CHARACTERS DURING RECEIVE MODE | ENTERING INTO RECEIVE Y2 STATE | | | | RESULT OF MICROINSTRUCTIONS DEFINED BY UFOC=0 |
| SET BY SW | GENERATE OUTPUT CHARACTER PARITY DURING SEND MODE | GENERATE TRANSMIT CARRIER DURING SEND | V LOADED WITH MESSAGE TO BE SENT; V READY FOR MESSAGE | MESSAGE IN V IS THE END OF OUTGOING MESSAGE | MESSAGE IS LOADED INTO E MEMORY BUFFER | MESSAGE IS LOADED IN E MEMORY | BUFFER OVER FLOW | |
| RESET BY HW | CONTROLLER GOING FROM SEND TO RECEIVE | BREAK CONDITION DETECTED ON INCOMING DATA LINE | OUTGOING MESSAGE IN V TRANSFERRED TO W; V READY FOR OUTGOING MESSAGE SEND | EXITING FROM RECEIVE Y2 DUE TO START OF DATA RECEPTION CONTROLLER GOING FROM SEND TO RECEIVE | | | | RESULT OF MICROINSTRUCTIONS DEFINED BY UFOC≠0 |
| RESET BY SW | BEFORE ENTERING RECEIVE OR BEFORE ENTERING SEND IF PARITY GENERATION NOT REQUIRED | WHEN TRANSMIT NOT RECEIVE SEQUENCE HAS BEEN COMPLETED | MESSAGE RECEIVED IN V DUMPED INTO MEMORY; V READY FOR MESSAGE IN RECEIVE MODE | BEFORE ENTERING RECEIVE BEFORE ENTERING SEND IF NOT EOM | WHEN ENTIRE MESSAGE IS ACKNOWLEDGED | WHEN RX MESSAGE IS READ OUT OF E MEMORY | WHEN TX-RX IS REINITIATED | |
| NAME OF FLAG | PARITY | TRANSMIT CARRIER | V LOADED SEND / RECEIVE | SEND RECEIVE | TRANSMIT READY | MESSAGE RECEIVED | TX-RX FAULT | COMPARE |

HW=HARDWARE   SW=SOFTWARE

United States Patent Office 3,564,509
Patented Feb. 16, 1971

---

3,564,509
DATA PROCESSING APPARATUS
Cornelius C. Perkins, Birmingham, John H. Pedersen, Detroit, Hoy Ying Chang, Westland, and Michael M. Malmer, Jr., Livonia, Mich., assignors to Burroughs Corporation, Detroit, Mich., a corporation of Michigan
Filed Apr. 22, 1968, Ser. No. 723,088
Int. Cl. G06f 15/16, 15/40
U.S. Cl. 340—172.5
19 Claims

ABSTRACT OF THE DISCLOSURE

A data processing system having a main data processor and a plurality of remote terminals each having data processing capability. The main or central processor is coupled in a polling environment to the various terminal processors via a communication link. Communication or data transmission of each of the various peripheral or terminal processors to and from the central data processor is controlled by separate line discipline processors. A line discipline processor is coupled and responsive to the respective data processor at each remote site. The line discipline processor at each remote terminal edits and assembles the information to be transmitted and identifies, edits and assembles information received and performs other tasks related to the communication function thereby providing micro-programmed line discipline.

BRIEF DESCRIPTION

This invention relates to a data processing system and more particularly to an improved on-line, multi-terminal data processing system and a remote terminal therefore.

BACKGROUND

It is well known that computers are being utilized at an ever increasing rate to perform various functions in the commercial, manufacturing and scientific world. The application of computers to various operations may conveniently be divided into two operating modes, namely: on-line systems and batch processing systems. A real-time or on-line system may be defined as a data processing system in which the time delay in a central processor responding to an input stimulus is negligible in the time reference of the user's equipment.

In a typical on-line commercial computer application it is often desired to access and process a centrally located data file. For example in a bank it is often necessary to obtain or update certain account balances kept in a file of bank accounts. Similarly insurance companies find it is necessary to periodically update information in various files such as the amount of insurance, the premium data and the extent of insurance coverage for each insured person. High speed electronic data processing systems are commonly used for storing files of information for banks, insurance companies and the like. Further, in such businesses, it is often desirable to have a centrally located data processing system including high speed electronic central processor and peripheral equipment and to employ remote terminal devices for entering information from any of a number of remote terminals. Such remote terminals may be located, for example, at branch offices of the banks or insurance companies.

Prior art systems of which applicants are aware employed conventional teletype writer terminals as the remote terminals for transmitting messages in the form of alphanumeric pulse coded signals to the central computer and for receiving replies therefrom. Such a system of necessity was designed to meet a number of requirements including means for assuring that messages transmitted from and received by the data processor are received free from error. Also since the central data processor typically operates at speeds much faster than a teletypewriter terminal, the system should be arranged to permit the processor to work substantially independent of any terminal while the operator is preparing and transmitting the message. In addition, the system should permit entry of a message from any typewriter without interfering with the operation of the other similar terminals. In the past the system control has been defined by the central data processor. This represented a considerable work load on the central processor in that the message formating and system control consumed a considerable portion of the central processor's time.

In commercial banking and other on-line systems it is desirable to have the ability to perform data processing at the remote stations. Prior art systems which use the teletypewriter-type remote data terminal generally required a batch type operation for transmitting data from the remotely operated computer via the teletypewriter terminal to the main processor. As hereinabove stated this type operation imposed the transmission control function on the main processor which had to format and assemble all messages and exercise system priority control. Thus the overall efficiency or throughput of the central data processor was greatly decreased because of its time consuming system function control tasks.

Accordingly, it is an object of the present invention to improve the efficiency of transmission of data between a plurality of remotely situated computers and a central data processor.

It is a further object of the present invention to increase the operating efficiency of a plurality of remotely situated data processors which are on-line with a central data processor.

It is a further object of the present invention to relieve the central data processor in an on-line data processing system environment from the supervisory control of all information transmitted to remotely controlled data processors.

It is yet another object of the present invention to increase the off-line computing capability of a plurality of data processors which are connectable on-line with a central data processing system.

It is a still further object of the present invention to improve communications between a central data processor and the plurality of remotely situated data processors.

It is yet another object of the present invention to provide improved means for controlling the communication on-line between a central data processor and a plurality of remotely situated processors arranged in a polling environment.

BRIEF STATEMENT OF THE INVENTION

The above objects and other desirable aspects are achieved in accordance with applicants' invention by utilizing a line discipline processor at each remote terminal for controlling transmission line discipline between the remote processor and a central processor linked in an on-line, real time system. This system architecture relieves both the remote processor and the central processor from various tasks including messages assembly, message formating, message editing and parity checking which are associated with on-line, real time data transmission systems. The line discipline processor in accordance with applicants' invention communicates with its remote processor by setting appropriate stages of a flag register in the line discipline processor which are periodically monitored by the remote processor. The remote processor thereby controls the access to and from the line discipline processor. After the remote processor has assembled a message to be transmitted, it signals the line processor that it is ready to transmit a message. When appropriate, as indicated by the flag register in the line processor, the message is transferred to the transmit buffer or tank of the line discipline processor. Thereafter the remote processor is free to return to its normal program and process other data while the line discipline processor awaits a poll inquiry signalling its opportunity to communicate with the central processor. Similarly in the receive mode, the line discipline processor responds to a selection inquiry of the central processor and assembles, edits and parity checks the message received from the central processor for the remote processor. After the line discipline processor determines that a message has been properly received and assembled, it sets appropriate flags to indicate to the remote processor that it has a complete message for it from the central processor. The remote processor then interrupts its program momentarily to receive and execute the task involving the data transmitted to it from the central file, thereafter returning to its normal program.

For a more complete understanding of applicants' invention as to its preferred structure and method of operation reference may be had to the following detailed description in conjunction with the drawings wherein:

FIG. 1 is a block diagram of a data processing system incorporating the principles of the present invention.

FIG. 2 is a symbolic block diagram of a remote terminal computer in accordance with one aspect of the principles of the present invention.

Figures 5A, 5B, 5C:
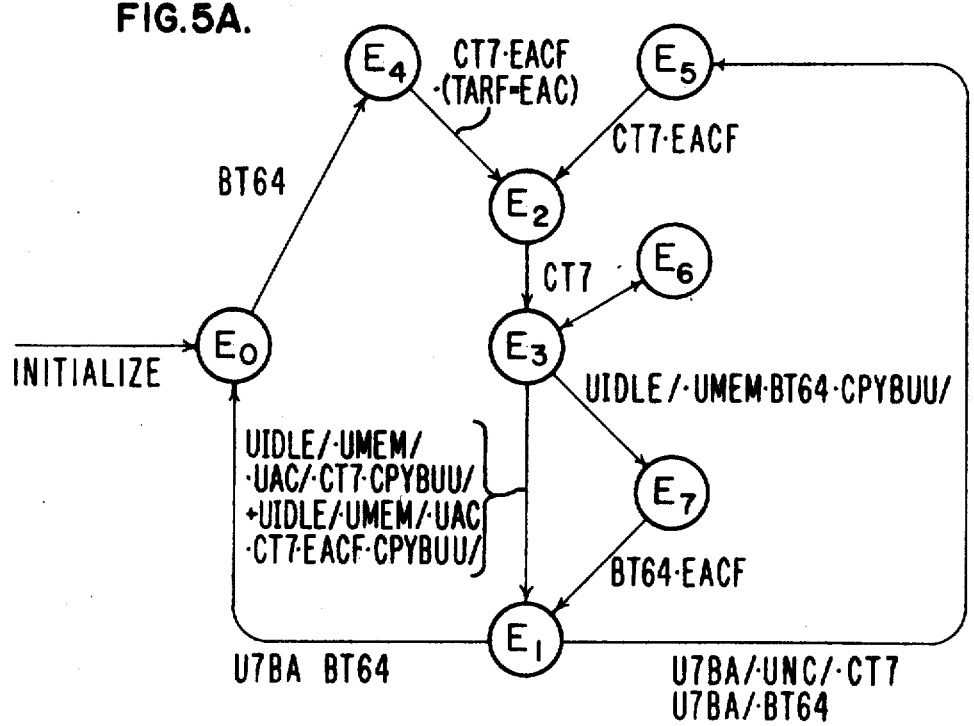

FIGS. 5A, 5B and 5C together illustrate the structural and logical operation of the state machine of applicants' line discipline processor.

FIGS. 6A, 6B and 6C together illustrate the structure and logical operation of the line discipline processor state machine for inter-processor information exchange.

Figure 7A:
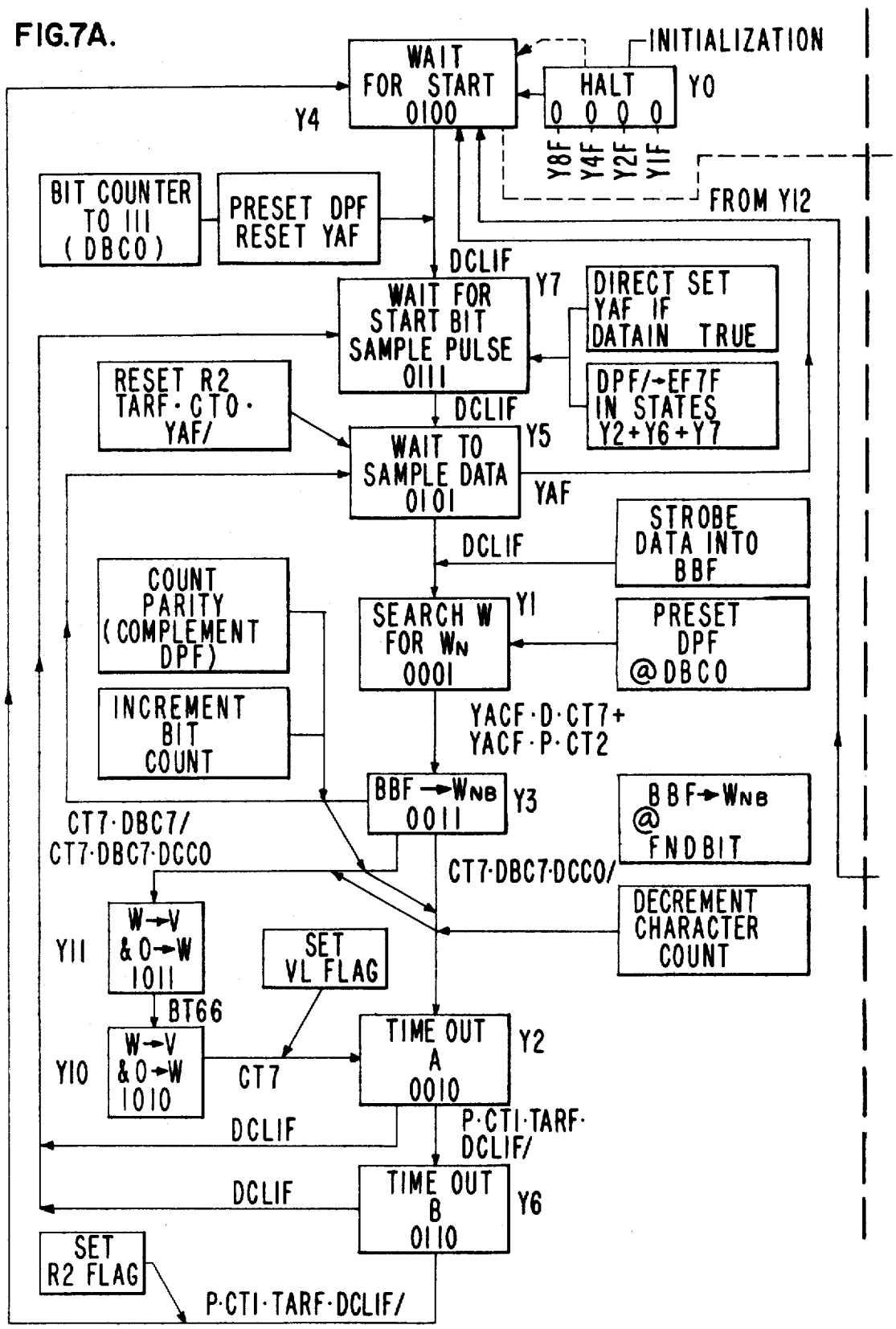
Figure 7B:
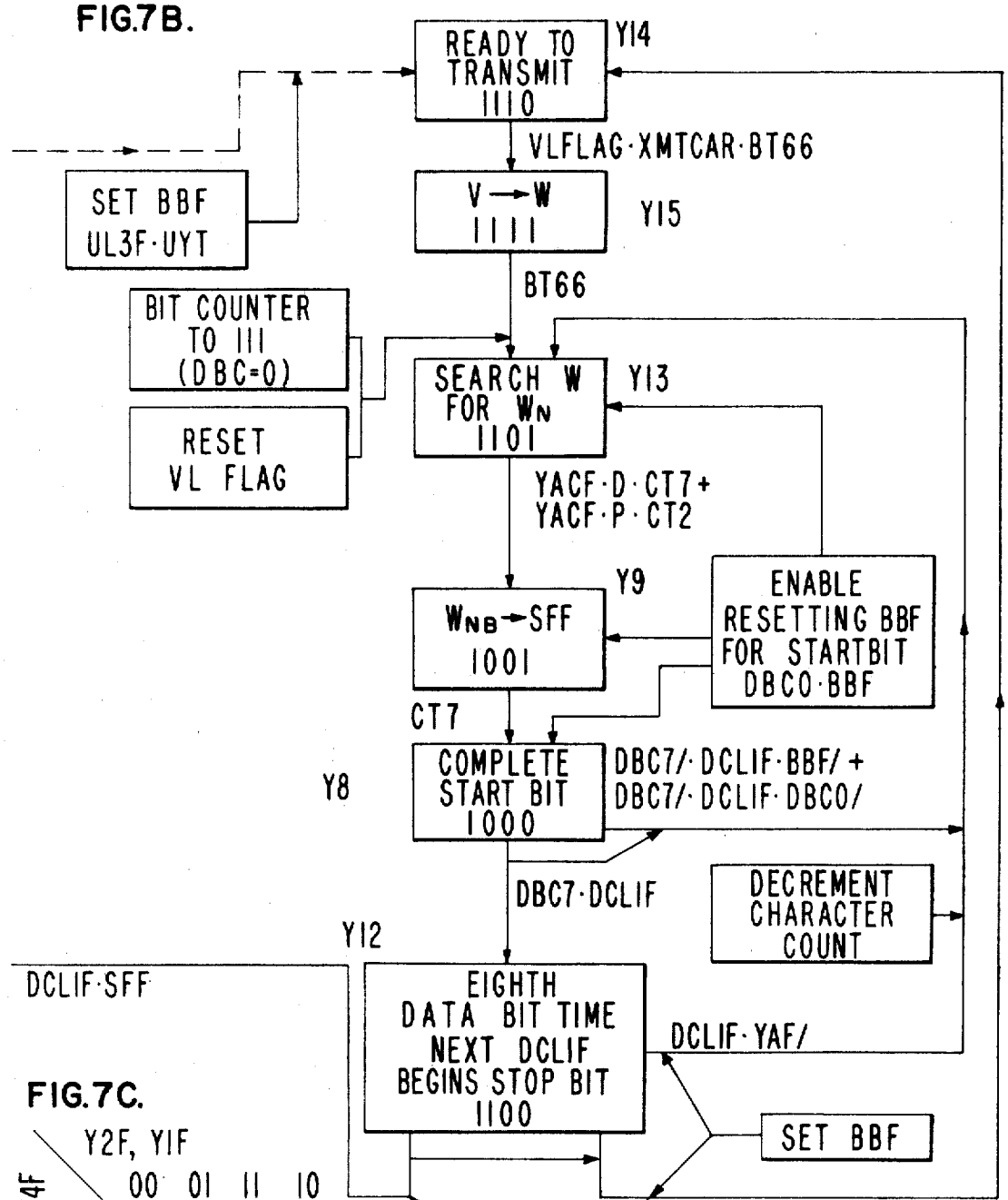
Figure 7C:
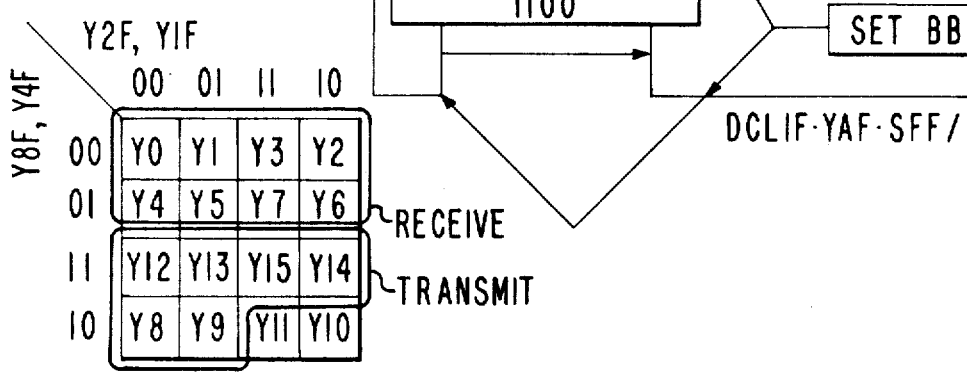

FIGS. 7A, 7B and 7C together illustrate the structure and logical flow diagrams for the datacomm controller state machine in the transmit and receive mode respectively.

Figure 8:
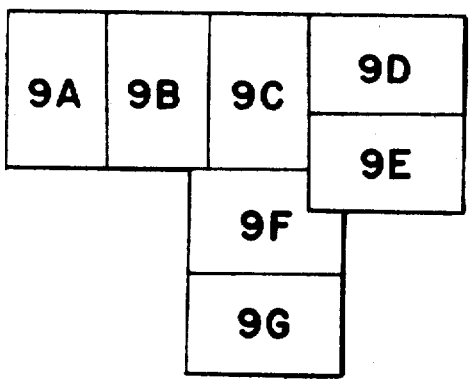

FIG. 8 is a layout diagram showing the positional orientation of FIGS. 9A through 9G.

FIGS. 9A through 9G together comprise a detailed logical block diagram of the remote terminal in accordance with the principles of the present invention.

Figure 10A:
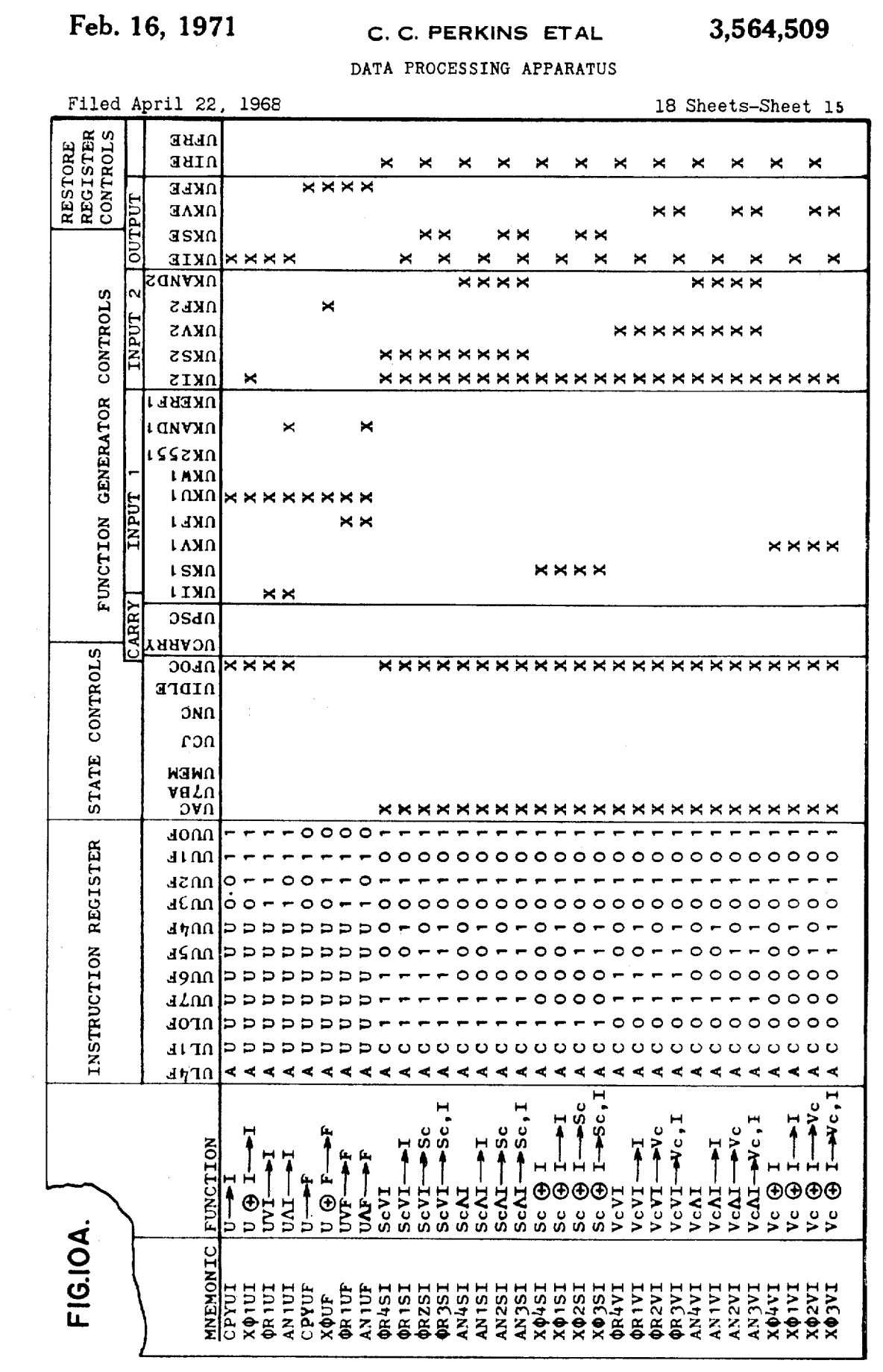
Figure 10B:
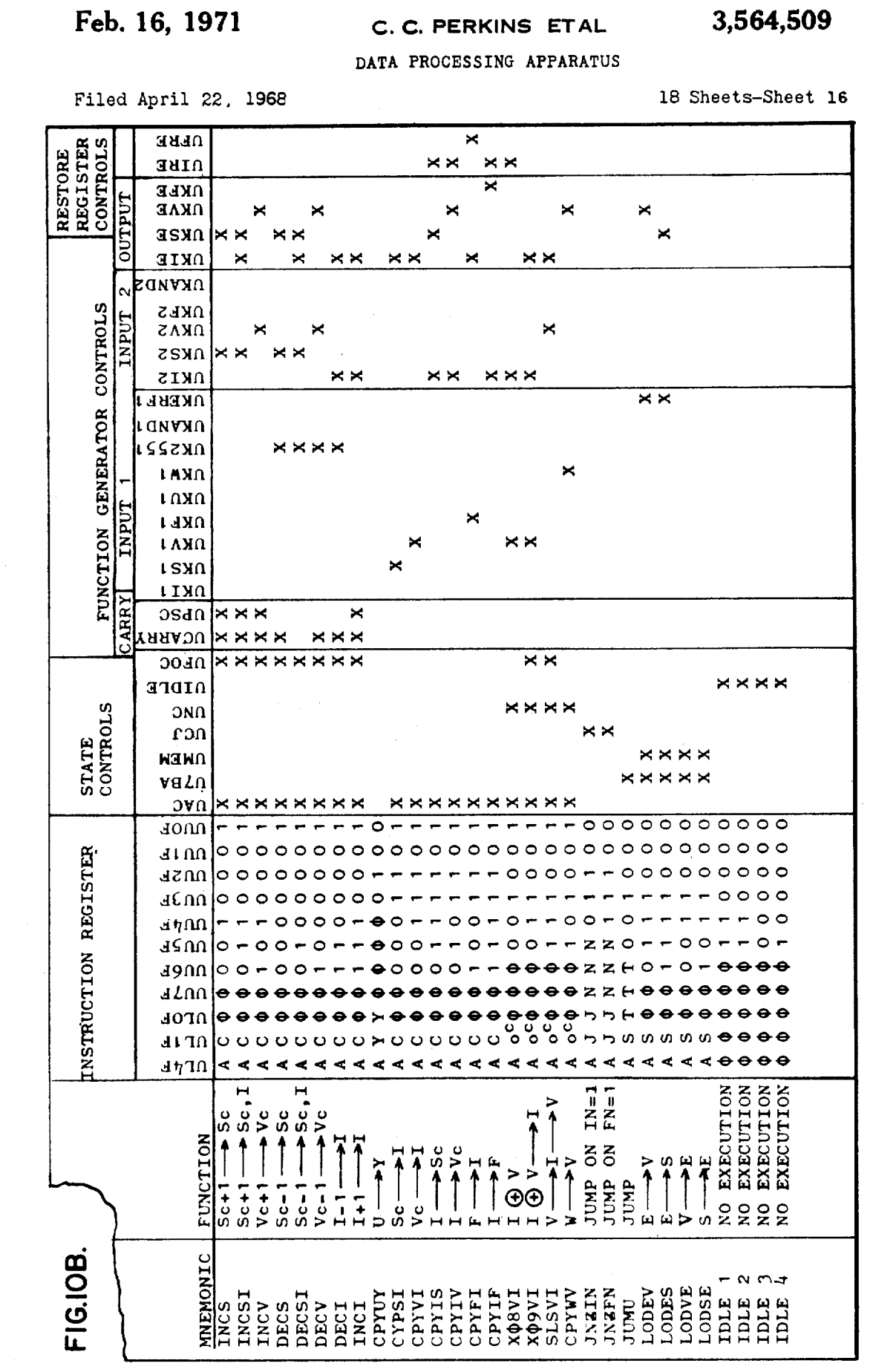

FIGS. 10A and 10B comprise a typical listing and description of a repertoire of instructions available for use in a terminal computer embodying the principles of the present invention.

FIGS. 11A through 11D illustrate the format of typical message exchanges between a remote terminal and a central data processor.

FIG. 12 illustrates the function and operation of the various stages of the flag register of applicants' line discipline processor.

Referring now to FIG. 1 there is shown a block diagram of a typical system embodying the principles of the present invention. As shown a central data processor 11, for example comprising a Burroughs B5000 and its associated complement of input/output storage devices 13, 15, 17 and 19, is connected via a communication link 21 to a plurality of remote terminal computers 23. In a typical installation, the central data processor 11 would be located in the main business office of a commercial firm, for example a bank, and the remote terminals would be located in branch offices of the commercial firm. The branch offices may be in the same general location or remote therefrom and in each case they are connected via a modem 25 to a communication link. The link 21 for example, may comprise telephone lines connecting the terminals 23 via a central communication exchange 27 to the site of central processor 11. In the preferred embodiment of applicants' invention the remote terminal computers are arranged in a polling and selection environment whereby the respective terminal computers 23 are arranged to perform data processing functions in accordance with its respective program off-line and to communicate with the central data processor whenever the central data processor addresses the terminal and indicates that it is ready to initiate data communication with the addressed terminal.

Referring now to FIG. 2 there is illustrated a simplified block diagram of a terminal computer 23 in accordance with the principles of the present invention. For purposes of illustration applicants' terminal computer may be described as comprising three sections: a remote processor 33 including a memory 34, an arithmetic unit 35, an input keyboard 37 and an output printer 39; a line discipline processor 41 with its function generator 43 and memory 45; and a datacomm terminal controller 47. The structure and operational inter-relationship of the sections of the terminal computer 23 will be discussed in detail hereinafter in conjunction with FIGS. 3 and 9, with similar reference numerals being used to designate the respective sections of the terminal computer 23.

Briefly the remote or terminal processor 33 comprises a stored program machine in which object data is manipulated in an arithmetic unit 35 in accordance with a sequence of micro program instructions stored in and withdrawn from the main memory in a predetermined sequence. Keyboard 37 is arranged to enter program and object data into the processor and the output device 39 is arranged to generate a hard copy printout. The remote processor 33 communicates in an on-line mode with a central data processor 11 via the line discipline processor 41 and the data controller 47. The datacomm controller 47 is in essence a buffer for receiving and transmitting information in a serial bit form under the control of the line discipline processor. The line discipline processor 41 is a stored program machine in which the stored micro program controls the assembly, editing and formating of messages to be transmitted to and which are received from the central data processor 11 for the remote processor 33.

In response to a polling inquiry from the central processor, the line discipline processor responds in accordance with its activity state as determined by the processor 33. As will hereinafter be more fully explained, messages prepared by the processor 33 are transmitted to the memory 45 and upon appropriate signal from the central processor 11 are transferred under the control of the line processor 41 to the data controller 47 to await transmission via the transmission link to the central processor 11. After the message has been transferred to the line discipline processor 41, the remote processor 33 is free to return and perform other tasks while processor 41 awaits transmission to and response from the central processor 11. The line discipline processor 41 performs parity checks on transmitted and received data and may automatically establish and insert appropriate message headers. In response to a selection inquiry from the central processor 11 the line discipline processor transmits a message to inform the central processor whether it is ready to receive a message. Whenever a message has been received and verified and stored in the memory 45 of the line discipline processor 41, the line discipline processor sets appropriate flag registers (FIG. 12) to signal the main processor that it has a message for it. The processor 33 periodically monitors the state of the flag register and appropriately interrupts its processing program to receive the data and execute the command intermediate the successive steps of its process program being run.

Figure 3:
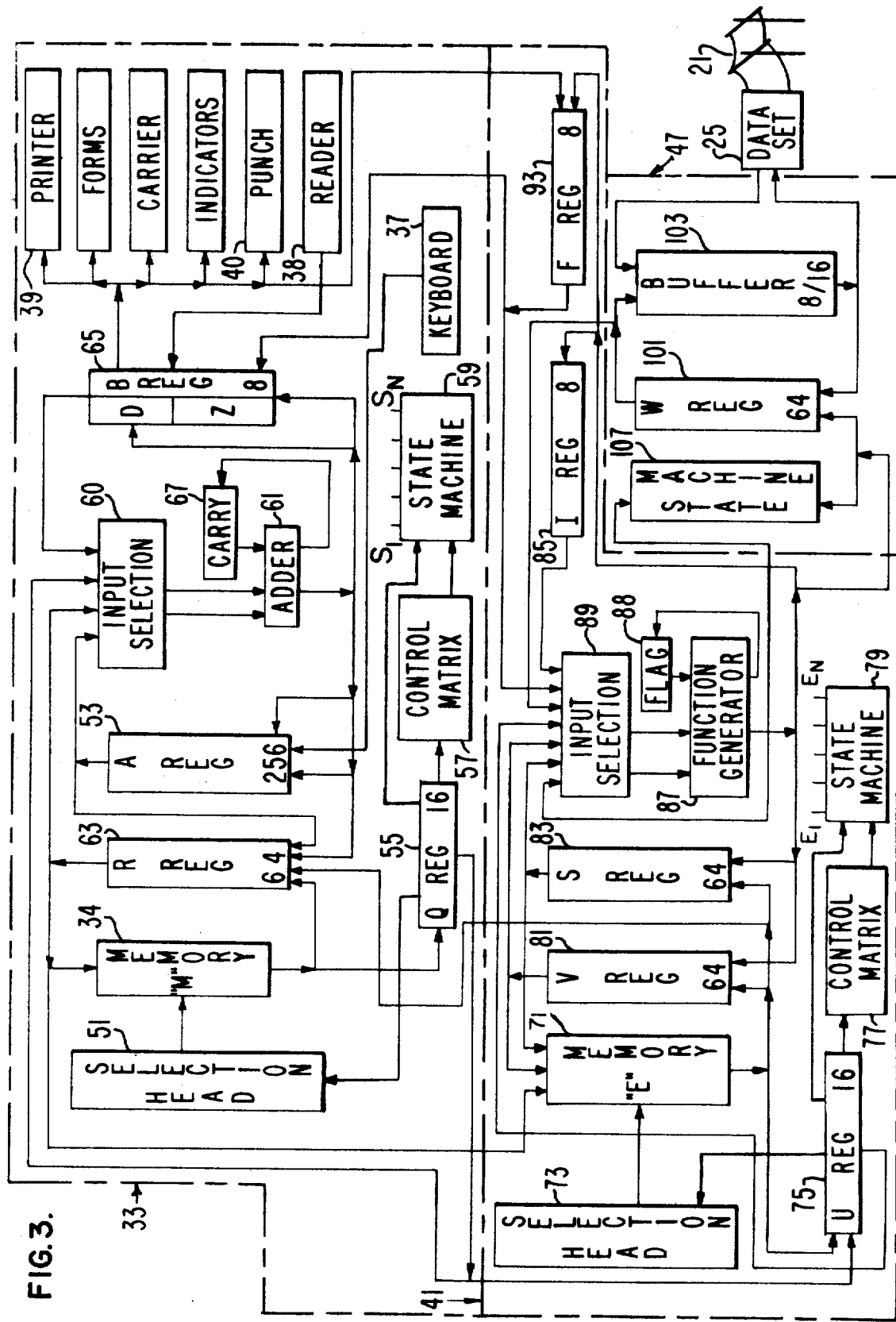
FIG. 3 is a simplified functional block diagram of a remote computer terminal embodying the principles of the present invention.

Referring now to FIG. 3 there is shown a block diagram of the terminal computer 23 embodying the principles of the present invention. The structure and operation of the remote processor 33 will first be discussed and then the structure of the line discipline processor 41 and its inter-relationship with the remote processor 33. Basically the remote processor 33 comprises a stored program digital computer of the type disclosed and claimed in copending application Ser. No. 680,184 filed on Nov. 2, 1967 in the names of Perkins et al. The Perkins et al. application is assigned to the assignee of the present invention and is incorporated herein by reference.

Briefly, the remote processor 33 comprises the main memory 34 for storing information in encoded form. The main memory may comprise a rotatable magnetic disk having a plurality of read/write heads for accessing a main memory section and a plurality of read-only heads for accessing a restricted, stored program portion of the memory. The information and object data stored in main memory 34 is processed in the arithmetic unit 35, including an adder 61, carry circuit 67 and input selection network 60, in accordance with program instructions withdrawn from the read-only portion of the memory. Head address selector 51, which may comprise an address register and association selection matrix, is arranged to access the appropriate portion of memory 34 in response to an address loaded therein. In operation a micro instruction counter, for example a word in recirculating A register 53, is normally pre-set at the beginning of an operation to a predetermined count and is arranged to sequentially withdrawn the serial program steps stored in the read-only portion of the memory in accordance with a count in a program counter, not shown. In accordance with the preferred embodiment, a word in main memory comprises a plurality of syllables, for example four. The instruction counter periodically interrogates the main memory 34 and thereby withdraws the appropriate program instruction indicated by the address loaded into head selector 51. The micro instructions withdrawn from the read-only portion of memory are sequentially loaded into micro-instruction register 55. The output of the micro-instruction register enables a control matrix 57, which through a commutable logical array, generates appropriate control signals for controlling various gating functions in the processor in accordance with the contents of the register 55. The control matrix in conjunction with the state machine 59, which logically generates a sequence of timed machine state levels or pulses for controlling the various logic functions, controls the operation of the adder 61 and the interloop transfer between the registers 53, 63 and 65.

Where a word in main memory 34 comprises a plurality of syllables, the processor for example via the carry mechanism 67 of adder 61 generates an appropriate increment signal to increment a syllable counter (not shown), which may comprise a portion of the A register 53. In this manner the word and syllable counters respectively are advanced each time the processor completes a predetermined number of micro program steps thereby readying the transfer of the next syllable or, where appropriate, word from the memory to the instruction register 55. In a manner hereinabove described each new program instruction transferred to instruction register 55 enables the control matrix 57 and the state machine 59 to develop the appropriate signals for controlling the manipulation of data in the arithmetic unit 61 and inter-register transfers between registers 53, 63 and 65.

Each time the syllable counter reaches a predetermined count it again generates the carry signal via the carry device 67 of adder 61. This carry signal increments the instruction counter thereby advancing the instruction counter to the next count in its orderly count sequence. In response to the new content of the instruction counter, the next in a series of micro-instructions would be withdrawn from the main memory 34 and serially fed to the instruction register 55. In this manner the respective sequential syllables of a memory word in the instruction register would be transferred to the micro-instruction register 55 to properly energize the control matrix 57 in accordance with the respective contents of the syllables of the word withdrawn from memory. Thereafter the control matrix and state machine in response to the contents of the contents of the micro-instruction register generate appropriate logic signals to enable the processor to accomplish the task indicated by each instruction syllable. In this manner the various sequential steps of the serial program are sequentially executed thereby generating the appropriate output on printer 39 or punch 40 corresponding to the program and object data contained in the main memory 34.

The program and object data may be loaded into main memory 34 from a keyboard 37 or any memory loading means, for example peripheral devices as a tape or card reader 38. The information from the tape card reader is arranged to be read into the processor via an input/output register 65 and transferred under program control to the main memory 34. As is known to those skilled in the computer art, the timing and sequencing of various ones of the operations of computer type apparatus must be accurately maintained. Timing is controlled by the state machine 59 which schematically illustrates circuitry for generating the necessary logical levels for controlling the operation of the various gating. The state machines 59 and 79 as hereinafter to be described in conjunction with FIGS. 5 and 6 generate appropriate logic levels for enabling gates at times determined by a basic computer clock, which may comprise for example a timing track on the main disk memory. In conjunction with other logical signals entered or generated by various input and control devices, the clock determined signals cyclically generates appropriate logic element controlling signals.

The remote processor 33 in accordance with applicants' present invention may operate in either of two modes: (1) off-line and independent of the central data processor 11, i.e. where the remote processor 33 does not require access to central files, the central processor etc.; or (2) on-line, i.e. wherein the remote processor 33 is dependent upon the central data processor 11 or some portion of it for proper operation of a task. In the second or on-line mode, the remote processor 33 is coupled via data set or modem 25 to the communication link. The remote processor preferably communicates with the central data processor in an ASCII code serial bit over private, dedicated lines. However, the apparatus may be adapted to operate over any switched communication link. As is known, the maximum data transmission rate is a function of the qulity of the transmission channel. Typical data rate examples for the embodiment illustrated in FIGS. 3 and 9 utilizing the seven bit plus parity ASCII codes, are 600 and 1200 baud, however 1800 bits per second for synchronous channels and in the order of twenty to twenty four hundred bits per second are likewise achievable with appropriate modifications over adequate channels.

The line discipline processor 41 is generally similar in structure and operation to the remote processor 33. As shown, a memory 71 is arranged to store data and a series of micro instructions for controlling the manipulation of said data. A head selection matrix 73 controls the accessing of the memory 71 and the withdrawal of micro instructions from the read-only portion and the data from the read/write portion. The micro instructions are withdrawn from the memory 71 and read into micro instruction control register (U)75. As hereinabove described in conjunction with the remote processor 33, the contents of the micro instruction register 75 controls a decode control matrix 77 which generates appropriate control signals in response to the contents of the micro instruction control register 75 and other logical input signals. The control matrix in combination with the state machine 79 generates appropriate logic gating levels for controlling the interregister transfer and logical gating in accordance with the main processor clock determined by the remote processor 33.

As described in the hereinabove cross referenced copending application for patent, information may be manipulated by coupling the input and output of various registers 81, 83 and 85 to the respective two inputs or output of the function generator 87. The function generator has a dual input selector circuit 89 and may comprise for example a full adder. By coupling an input, for example, from the "V" register 81 to one input of the input selector 89, and the output of the function generator 87 to the input of the I register 85, it is possible to interchange, compare or transfer information between the registers. The flag register 93 is arranged to store a plurality of condition indicating flag or signal sequences, for example a "send" or "receive-ready" condition. The flag register 93 is coupled to the B register 65 of the remote processor 33. By periodically monitoring the contents of the flag register 93 for example by transferring the contents of register 93 to the B register 65, the remote processor 33 can monitor the operation condition of the line discipline processor 41.

As hereinabove stated each terminal computer 23 is particularly designed and adapted for use in a polling environment utilizing multi-drop points on a communication channel. The communication channel preferably comprises a private, dedicated duplex line, for example a telephone line. The central processor 11 (FIG. 1) communicates with a terminal computer 23 by sending a polling or selection message to a particular remote terminal computer. For purposes of this description: a polling message will be described as one in which the central computer 11 asks an addressed remote terminal 23 whether it has a message to be sent to the central processor; while a selection message is defined as one by which the central data processor 11 interrogates an addressed remote terminal 23 to determine whether it is ready to receive a message from the central processor. The frequency of polling by the central processor is a function of the various tasks the central processor is to perform. The polling frequency can be varied during any time period without effecting the remote operation of the terminal computers 23 other than changing the frequency of transmitting and receiving messages to and from the various remote terminals 23.

When the remote processor 33 of a terminal computer 23 has a need to communicate with the central processor 11, it assembles the message in a specific area of its memory 34. After monitoring and determining the condition of flag register 93, the remote processor 33 selects the appropriate time and transfers the message from memory 34 to the "send" buffer portion of memory 71 in the line discipline processor 41. Thereafter the remote processor 33 returns to another off-line task and the line discipline processor 41 awaits for a poll from the central data processor 11 to initiate the transmission of the stored message data. The sequence of message transmission between the line discipline processor and central data processor 11 will be discussed in detail hereinafter in conjunction with FIG. 11.

When the line discipline processor 41 receives a select message from the central processor, the line processor 41 acknowledges the selection message by transmitting an appropriate message, for example a single character indicating it is in the "receive-ready" condition. After receiving the receive-ready acknowledgement (ACK), the central processor 11 then transmits the message addressed to one of the remote terminal computers 23. The received data is assembled and stored in buffer 101 of data controller 47. As in hereinafter to be more fully explained in conjunction with FIGS. 7A and 9, datacomm controller 47 assembles the received characters as directed by the line processor 41 and then transfers the data from register 101 to the V register 81. After the addressed line discipline processor determines that the message is for it and parity checks, the data may be transferred from the V register 81 to the receive tank of the memory 71.

When the message is properly received, the line discipline processor 41 acknowledges receipt of the error free message by transmitting a message received acknowledgement character. Upon receipt of the received acknowledge character, the central processor 11 reinitiates its polling routine. The received message text is then stored in a specific area of memory 71 of line processor 41 and the appropriate flag (FIG. 12) is set in flag register 93 indicating that the line processor 41 has a message for its associated remote processor 33.

As hereinabove described the remote processor 33 periodically monitors the flag register 93 to determine whenever the line discipline processor 41 has a message from the central processor for it. This periodic monitoring for example may comprise an interrogation of the flag register contents upon completion of a predetermined group of micro instructions by the remote processor 33. Whenever the contents of flag register 93 indicate that the line discipline processor 41 has a message complete form ready for transfer to the remote processor, the remote processor under micro instruction control interrogates the receive portion of memory 71 via head select 73 thereby transferring the information via the R register 63 to a location in memory 34 designated by the contents of the micro instruction register 55 of the remote processor 33.

In a manner hereinafter to be more fully described in conjunction with FIGS. 7A and 9, the datacomm controller state machine 107 controls the assembly of received messages in accordance with word and bit assembly instructions from line discipline processor 41. Similarly the state machine controls the sequential transmission of data in accordance with word and bit assembly instructions. Briefly the state control machine 107 in response to an instruction from the line discipline processor assembles the received messages in buffer 101 at the word and character address designated by the line discipline processor. After receiving the appropriate number of words or characters designated by the line processor, it transfers the characters from the W register 101 to the V register 81. Similarly in the transmit mode, the message to be transmitted to the central data processor 11 is assembled in the V register from the memory 71 and then transferred to the W register 101 at a designated word and bit address. In response to similar control signals from the line discipline processor, the data controller selects the word and bits in accordance with instructions from the line discipline processor and transfers them via the bit buffer to the data set 25 for transmission to the central data processor. As is known in the art, the data set or modem converts the binarily encoded data into a form suitable for transmission over the communication channel, for example by frequency shift keyed encoding.

Figure 4:
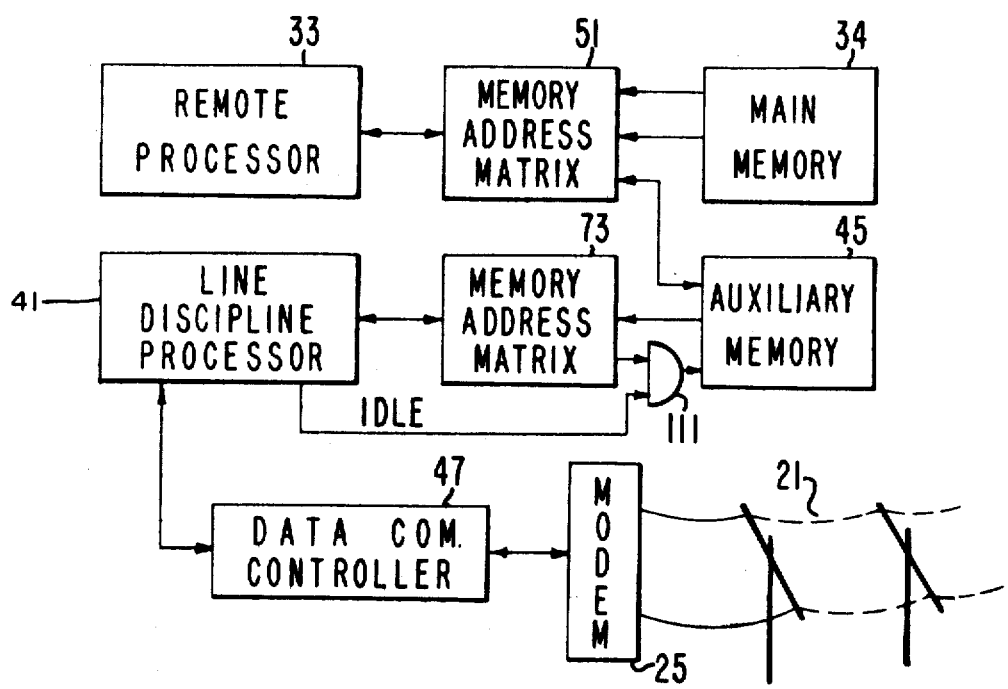
FIG. 4 is a simplified block diagram illustrating the remote processor and line discipline processor of applicants' terminal computer and their respective relationship for accessing the main and auxiliary memory associated therewith.

Referring now to FIG. 4 the preferred inter-relationship between the remote processor 33 and the line discipline processor 41 for accessing main memory 34 and the auxiliary memory 45 described in connection with FIG. 2 will now be explained. As hereinbefore described, the preferred embodiment of the memories 34 and 45 comprises separate tracks on a rotatably mounted magnetic disk. In this embodiment the remote processor 33 may be accessing its memory allocated portion, i.e. memory 34 of the disk while the line discipline processor 41 accesses its portion, i.e. memory 45. In this manner data processing by the remote processor 33 and message transmission or reception by the line discipline processor 41 may take place simultaneously. To avoid possible conflicts between the remote processor 33, which in accordance with applicants' invention is to be the controlling element, and the line discipline processor 41, it is desirable to control the line discipline processor's access to the memory 45 so that the processor 33 and the line discipline processor can not simultaneously attempt to communicate with various portions of the memory or various storage registers.

As shown schematically in FIG. 4 it is desirable to have the line discipline processor reside in an idle state whenever it is not either receiving or transferring information to or receiving information from processor 33. In the idle mode, the processor 33 is able to selectively access either the memory 34 or the auxiliary memory 45 thereby permitting the processor 33 to assemble a message and to transfer it to the send portion of the memory 45 for handling by the line discipline processor 41. With gate 111 controlling the time when the line discipline processor can access to the auxiliary memory 45; i.e. restricting access to those times when processor 41 is in the idle not ($\overline{idle}$) mode, all conflicts or necessity for queing between processors 33 and 41 are eliminated and the processor 33 is the determining element in the system.

DETAILED DESCRIPTION

Timing

In general the main functional elements of applicants' terminal computer, that is the remote processor 33, the line discipline processor 41 and the datacomm controller 47, are functionally independent, with a hierarchy of control extending from the remote processor 33 to the line discipline processor 41 and from processor 41 to the data controller 47. As hereinbefore stated, the processors operate on object data by withdrawing program step defining micro instructions. Each withdrawn micro instruction initiates a sequence of machine state changes to execute and accomplished the desired operation. The micro instructions in the remote processor 33 and line discipline processor 41 have no uniform division of the code length into predetermined subset, however each micro instruction has a number of bits assigned to denominate the address of the next micro instruction and a predetermined number of bits defining the operation to be executed.

In general the execution of micro instructions is accomplished in the remote processor 33 and the line discipline processor 41 by generating for each a predetermined sequence of control states within the various elements. As schematically shown in FIG. 3, each operative element of applicants' remote terminal includes a separate state machine which is designated 59, 79 and 107 for the remote processor, line discipline processor and data controller respectively. The state machines which define the different computer or operational states, generally comprise a plurality of bistable elements in a flip-flop counter configuration and a decoding network. By way of example the decoding network may comprise a diode decoder or an array of AND gates selectively energized in accordance with the contents of the state machine counter.

Referring now to FIGS. 5A through 5C, the state machine 79 of the line discipline processor 41 will now be explained. As shown in the Karnaugh map illustrated in FIG. 5B, the various states $E_0$ through $E_7$ are defined in accordance with various counts in the three flip flops ES1F, ES2F and ES4F. By presetting a particular binary count into these three flip flops, which comprise the state machine counter, any one of eight operating states $E_0$ through $E_7$ may be selected. Any conventional decoder circuit, for example an array of gates having its inputs connected to the various logical outputs of the state counter, is used to separate the eight states of the counter into a corresponding plurality of logical signals for controlling and timing the operations of the logical elements of the machine.

As shown in FIG. 5C the various states of the machine are assigned various logical functions. As hereinafter is to be fully explained, the logical signals associated with the respective states when coupled to appropriate gating accomplishes the desired functional operation.

As illustrated in FIG. 5A when the machine is initially turned on or initialized after the detection of an error, the counter of state machine 79 assumes the $E_0$ configuration. This initialized state $E_0$, as defined in the Karnaugh map of FIG. 5B, comprises resetting the respective flip flops ES1F, ES2F and ES4F to the zero (0) binary state. Upon the completion of the power-on micro instruction or another micro instruction in the normal operating sequence, the state machine enters either state $E_4$ or $E_5$, at the appropriate time designated by the basic timing pulses to search for and load the next micro instruction into the micro instruction register 75 of the line discipline processor. Search and loading of data continues into state $E_2$ and execution begins upon exit from state $E_2$ to $E_3$. Appropriate successive state changes as required, i.e., as necessary, for addressing the next instructions as shown in FIG. 6C, are made until the state machine returns to $E_4$ or $E_5$. In state $E_4$ or $E_5$ the next micro instruction is located and loaded and the cycle of the state machine repeats as necessary to accomplish the function specified by the withdrawn micro instruction.

In addition to executing its own micro instructions, the line discipline processor, in accordance with one of the features of the present invention, is able to execute micro instructions originating in the remote processor 33. For example these instructions might include accepting data transferred to the line discipline processor from the remote processor, or data flow in the opposite direction in which the line discipline processor transfers an assembled message to the remote processor. In essence, this inter-communication or data transfer from the line discipline processor to or from the remote processor comprises an exchange of information from the E memory of the line discipline processor to or from the M memory of the remote processor 33.

Referring now to FIGS. 6A, 6B and 6C, the operation of state machine 79 for decoding and executing micro instructions from the remote processor by the line discipline processor will now be explained. The Karnaugh map in FIG. 6B illustrates the four machine states defined in FIG. 6A. As shown in FIG. 6B machine states $E_3$ and $E_6$ (FIG. 5A) of the line discipline state machine are employed as two states determining conditions in conjunction with the state of the carrying flip-flop EKCYF of the line discipline processor to define the respective machine states $X_0$ through $X_3$.

Referring now to FIGS. 6B and 6C various functional sequences and logic equations are defined in terms of the machine state states $X_0$ through $X_3$. As illustrated $X_0$ is the reset condition in which the carry flip flop EKCYF and machine states $E_3$ and $E_6$ are respectively logical zero. The logical quantities or operating instructions defined by the logical equations in FIG. 6C will hereinafter be explained in conjunction with the detailed description of the function and operation of applicants' apparatus.

In a manner similar to that hereinabove described in conjunction with the line discipline processor, the function or operation of the data comm controller 47 is determined by the setting of the counter of its state machine 107. Referring now to FIGS. 7A, 7B and 7C, the various operations of the state machine of data comm controller 47 and the relationship of the operations to the count of its state counter will be explained. In FIG. 7C the respective states are defined in terms of a count registered in the respective stages of the state counter Y1F, Y2F, Y4F and Y8F. As shown of the sixteen unique counter bit counts, eight states are arbitrarily defined for use in the receive mode and six other states are arbitrarily defined for use in the transmit mode. In accordance with the established inter element hierarchy of command, the state machine of the data comm controller is responsive to the commands from the line discipline processor 41. In response to a command from the line discipline processor 41, the counter of controller state machine 107 assumes a predetermined count thereby readying it to function in either the designated receive or transmit mode. As is hereinafter to be more fully explained, the existence and detection of predetermined data signals, logical and control sequences forces the count in the counter along the path defined from state to state. The notation of an arrow head to a state or exit from a state signifies the indicated associated function is accomplished during the state or upon exit from it. As will be understood by those skilled in the art, the definition of the states which correspond to a predetermined count of the state machine counter is purely arbitrary and determined primarily by the connection of the gating and the decoder which is responsive to the contents of the state machine for developing the sequence of control state signals Y1 through Y16.

By referring now to FIGS. 7A and 7B in conjunction with Tables I and II below, the function of the various states in the receive and transmit mode respectively may readily be understood.

TABLE I

| State: | Function |
|---|---|
| Y0 | Halt-clear W. |
| Y2 | Wait to detect. |
| Y4 | Start bit if YBF and cardet is true. |
| Y6, Y7 | Wait for start bit sample pulse, proceed if data in line is low. Direct set YAF if data is high. |
| Y5 | Wait for data strobe pulse to strobe data into bit buffer. If YAF is true, shift to Y4. |
| Y1 | Search for character defined by DCC1F-DCC4F. |
| Y3 | Search for bit defined by DBC1F - DBC4F and strobe bit from BBF to W reg. |
| Y2, Y6 | Time out—i.e. wait for next received data for a program determined time. |
| Y11 | Transfer characters 1 through 7, guard bits, and the word parity bit from W to V, clear W reg. |
| Y10 | Transfer character 0 from W to V, clear W. |
| During Y0, Y2, Y4 or Y6 | Disable oscillator countdown. |
| During Y1, Y3, Y5, Y7, Y10 or Y11 | Enable OSC countdown. |

TABLE II

| State: | Function |
|---|---|
| Y14 | Ready to transmit—Wait for V loaded flag (EF5F) to be set by software and transmit carrier ready signal to be provided by modem. |
| Y14 | Transfer contents of V register to W register. |
| Y13 | Search for character defined by DCC1F-DCC4F. |
| Y9 | Search for bit defined by DBC1F–DBC4F and strobe bit into SFF. |
| Y13, Y9, Y8 | If DBCO·BBF is true, enable DCL1F to begin start bit (Reset BBF). |
| Y8 | If DBCO·BBF is true, enable start bit as above or; if DBCO/+BBF/, wait for DCL1F to strobe date bit from SFF to BBF. |
| Y12 | Wait for DCL1F to set BBF (Output stop bit). |

Referring now to FIGS. 9A through 9G, positionally oriented as shown in the layout diagram of FIG. 8 and in conjunction with other figures as appropriate, a detailed description of applicants' terminal computer will now be given. Identical numbers and letters are used throughout to designate the respective portions and elements of the remote processor 33, line discipline processor 41 and datacomm controller 47. In addition to the conventional logical symbols, as explained in the drawings for the logical AND gates and OR gates, the letter "F" is employed in the block diagrams as a last letter of an element designation for a flip flop. The flip flops may comprise standard, cross-coupled flip flops of any well known design. To simplify the description and drawings, a square box containing a letter is used to designate a gate input from a source of information bits, i.e., a register or register stage correspondingly denominated rather than connecting the gate input to the designated register.

As hereinabove described the remote processor 33 and the line discipline processor 41 are of similar construction, namely that disclosed and claimed in the hereinabove identified copending application. In the preferred embodiment of applicants' terminal computer, additional tracks and read/write heads are added to the rotatably supported disk memory to provide additional memory capacity required for the E memory of the line discipline processor.

REMOTE PROCESSOR

Figure 9A:
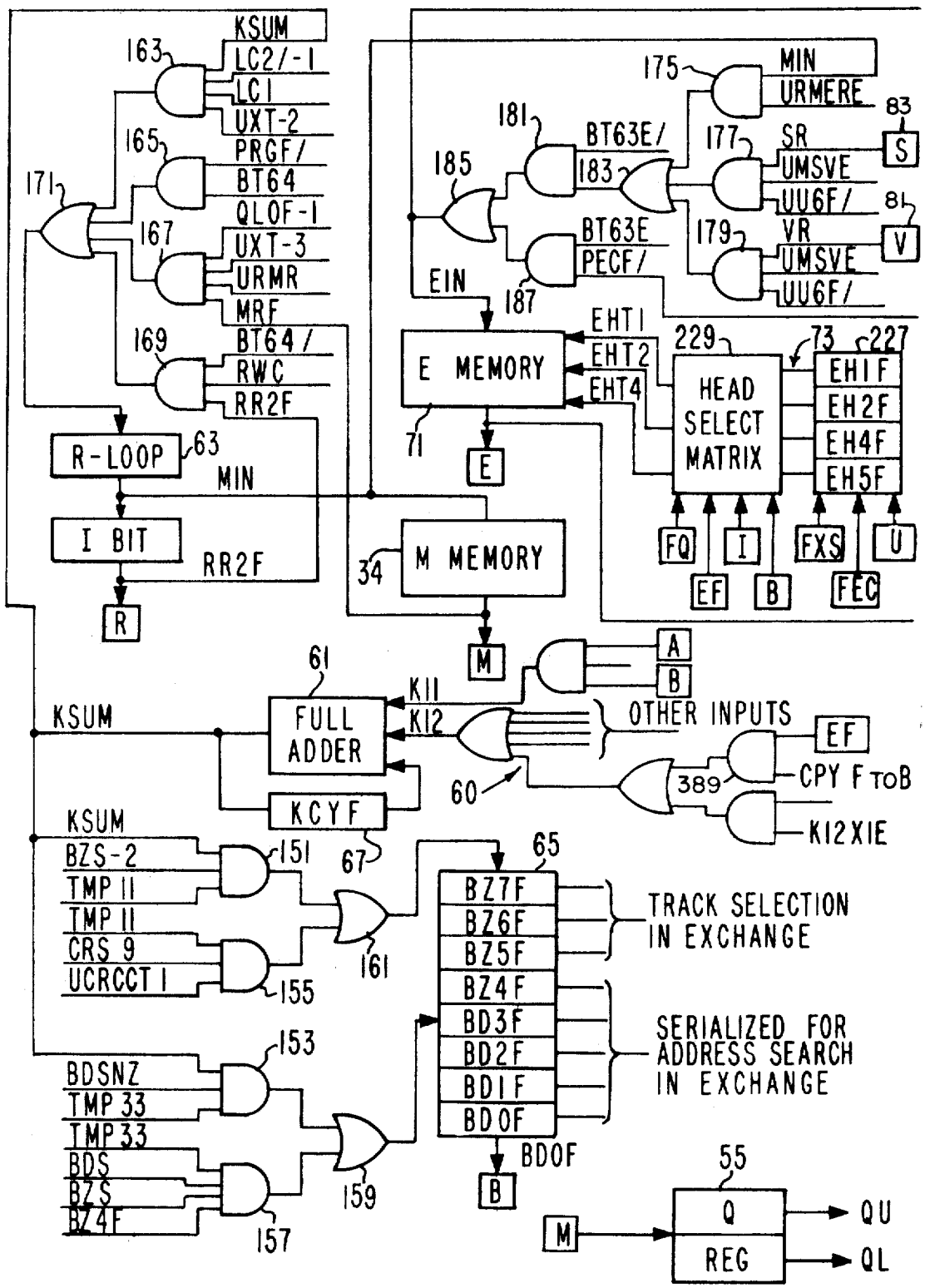

Referring now to FIG. 9A there is shown a partial logical schematic in block diagram form of the remote processor. As hereinabove described in conjunction with FIG. 3, the remote processor is a stored program machine capable of operating off-line to perform tasks in accordance with its stored program instructions. While FIG. 3 illustrates the complete block diagram of the remote terminal computer, FIG. 9A illustrates only those elements of the remote processor 33 used in communicating with the line discipline processor 41.

As hereinabove described the M memory 34 stores object data and micro instructions. In operation the micro instructions are sequentially withdrawn from the M memory via the R loop or register 63 and stored in the micro instruction register 55 for decoding. Each decoded micro instruction sets the state machine to generate the sequence of logical signals for carrying out the indicated operation (OP code). Arithmetic operations and interregister transfers are carried out via the input selection network 60 and the adder circuit 61. As illustrated the output from the adder circuit 61 is coupled to several parallel paths. A first path is to the input gates 151 and 153 of the D and Z sections of the B register 65. The outputs of gates 151 and 153 and gates 155 and 157, which couple other information sources to the B register, are coupled via OR gates 159 and 161 to the Z and D sections respectively. A second signal path from adder 61 is to the input gate 163 of the R register (or loop) 63. The other AND gates 165, 167 and 169 provide parallel input paths to the R register 63 from a parity bit generator, the output of the M memory and the output of the R register respectively. The outputs of gates 163, 165, 167 and 169 are coupled via OR gate 171 to the input of the R register 63. In the preferred embodiment, the R and A registers of the remote processor are recirculating type registers in which, for the R and similarly for the A, the output stage is continuously fed into the input via gates 169 and 171 whenever the other input gates 163, 165 or 167 are not energized.

In operation whenever it is desirable to transmit a message to the central processor, the operator selects the communication mode, for example from the keyboard. The selection of the communication mode results in the initiation of the message transmit micro instruction. In this mode the remote processor 33 assembles the message text and stores it in a particular memory location in the E memory. After the message to be transmitted to the central processor had been assembled, the remote processor 33 in a manner to be more fully described monitors the state of the line discipline processor 41 to determine whether it is ready to receive a message for transmission to the central processor. Whenever the remote processor determines that the line discipline processor is ready to receive the message text for transmission to the central processor, the remote processor 33 wtihdraws the appropriate micro instruction into the micro instruction register for initiating information transfer from the M memory via the R loop into the address in the E memory 71 designated as the send buffer.

After the message has been transferred, in a manner hereinafter to be described, the remote processor 33 is then free to return to its normal program from what in effect has been a jump instruction during which the previously assembled message was transferred to the line discipline processor 41 for transmission. By returning to its normal program, the remote processor is again able to continue its off-line task processing until it receives the information it requested from the central processor for completion of a particular task.

LINE DISCIPLINE PROCESSOR

Figure 9B:
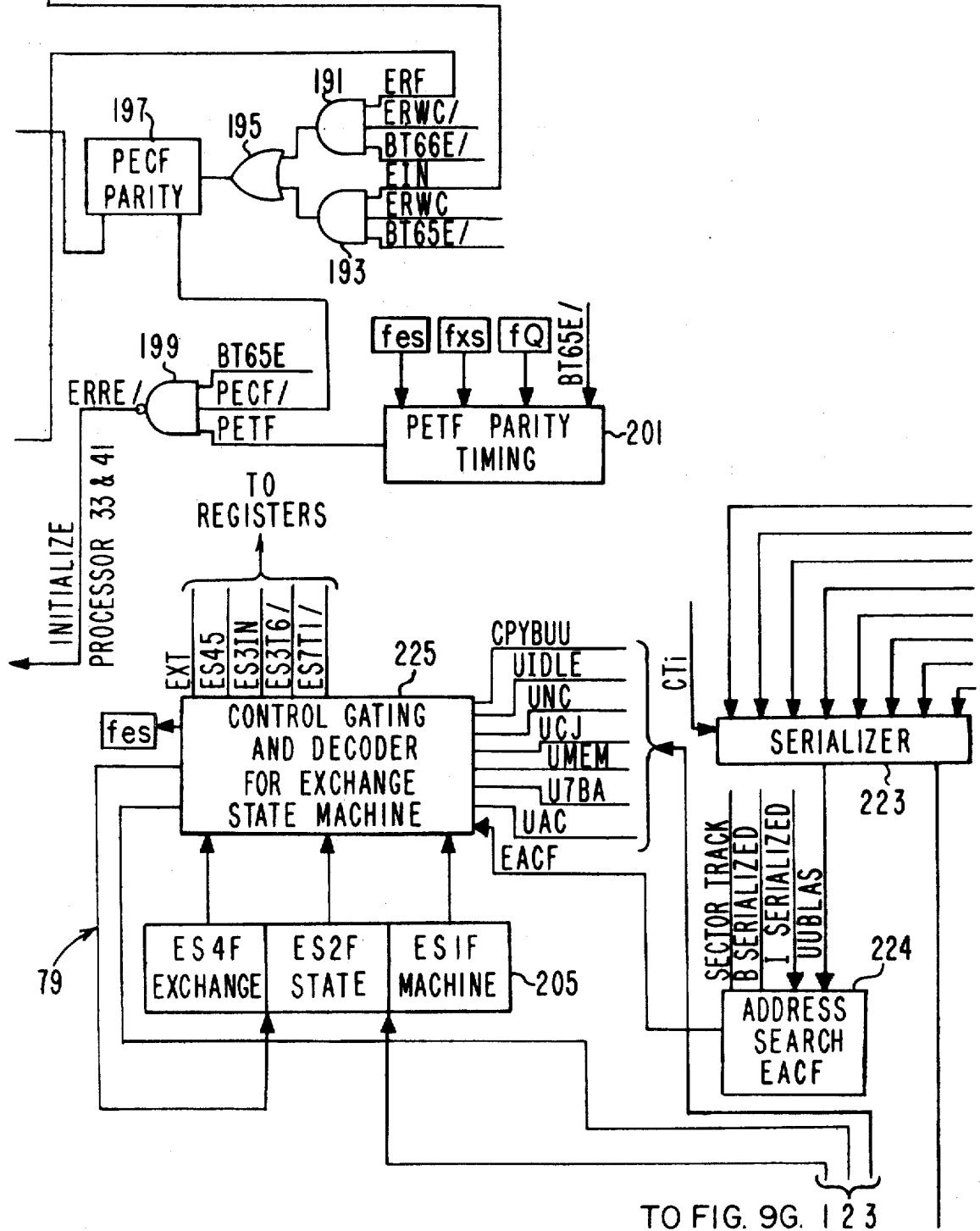

Referring now to the assembled FIG. 9 (composed of FIGS. 9A to 9E), the structure and operation of the line discipline processor 41 will be explained. The E memory 71 of the line discipline processor 41 is adapted to store information and data in a read-write portion of the E memory and micro program instructions in a read-only portion of the E memory. The information and micro program instructions may be entered or loaded via a separate memory loader, not shown, or via the keyboard 37 (FIG. 3) to the M memory of the remote processor 33. AND gates 175, 177 and 179 are coupled to the input of the E memory 71 via clocking gate 181 and OR gates 183 and 185. These gates provide an input path to the E memory from the M memory 34, the S register 83 and the V register 81 respectively. Gate 187 is designed to provide a path for the insertion of a parity bit at the propertime whenever information is being written into the E memory. AND gates 191 and 193 (FIG. 9B) respectively monitor the information read into and out of the E memory with gate 191 arranged to insert the parity bit during a write operation while gate 193 monitors to check parity on read. OR gate 195 couples the output of gates 191 and 193 to the input of a parity detector flip flop PECF 197. By monitoring the state of the parity flip flop at the appropriate clock bit time, gate 187 generates the proper parity bit for the information read from or into the E memory. Similarly gate 199 (FIG. 9B) monitors the state of parity flip flop PECF 197 at the appropriate parity timing, as determined as a function of the character and word length by parity timing circuit 201 to control the generation of a parity error signal. The output of gate 199 is used to signal a parity error to the remote processor and for example to re-initialize the processors in the event an error is detected during a read or write operation from the E memory.

As hereinabove described in conjunction with FIG. 3 the line discipline processor 41 is a stored micro program machine. Whenever the remote terminal is initially turned on or reset in response to a detected error, the turn-on or reset routine initializes or resets all bistable elements including the counters of the state machines and the flag register 93. Upon exit from the initialization state, a predetermined micro instruction located at a particular address is automatically loaded into the micro instruction register 75 thereby readying the machine to carry out sequential micro program steps.

The micro instruction register 75 as shown in FIG. 9C comprises a sixteen bit register divided into upper and lower sections designated UU and UL respectively. The inputs to the respective sections UU and UL of the micro instruction register 75 are coupled to the outputs of gates 211, 213, 215 and 217. These gates couple inputs to the respective sections of the micro instruction register 75 from the E memory 71 and the B register 65. The outputs from the respective sections of the micro instruction register 75 are coupled in parallel to the inputs of control matrix 77 (FIG. 9F), counter of the datacomm controller state machine 221 (FIG. 9D) and the serializer 223 (FIG. 9B).

As hereinabove described each micro instruction contains the address of the next micro instruction. The address portion of the micro instruction is coupled to serializer 223, which may comprise a plurality of sequentially operated gates, for converting the information read from the U register 75 in parallel into a serialized bit train at appropriate bit times designated by the clock pulse $CT_1$. The output of the serializer 223 is coupled to an address search flip flop EACF 224. The output of the address search flip flop EACF 224 is coupled to the control gating circuit 225 associated with the counter 205 of the state machine 79. The serialized address is coupled from the control gating decoder 225 to the input of the E memory address register 227 (FIG. 9A). This serialized address stored in the memory address register actuates the magnetic head select matrix 229 to control the selective addressing of a desired portion of the E memory. For example the appropriate read or write head operatively associated with a magnetic disk memory is energized to gate an input or output signal. In this manner the next micro instruction or data is addressed by register 227, read from memory 71 and transferred via gates 211 and 215 (FIG. 9C) to the U register 75.

As hereinabove stated the outputs from the U register are coupled to the inputs of the control decode matrix 77 (FIGS. 3 and 9F). The control matrix 77 preferably comprises a plurality of AND gates. As illustratively shown in FIG. 9F gates 77–1 and 77–2, and similar ones with different connections to stages of the U register, as hereinafter is to be more fully described in conjunction with FIG. 10, decode the respective contents of the U register 75 and generate appropriate control signals for the array of gates 231 through 246.

The outputs of gates 231 through 240 and 241 through 246 are coupled to the inputs of OR gates 249 and 251 respectively (FIG. 9G). The OR gates 249 and 251 comprise one embodiment of the input selection network 89 illustrated in FIG. 3. As hereinabove explained in conjunction with FIG. 3 interregister information transfer in the line discipline processor is accomplished, as it is in the remote processor, via the input selection network 89 and the function generator 87. As shown the inputs to the respective AND gates 231 through 246 comprise a logical or clocking level generated by the control matrix 77 and an information input from a designated register. An output from each of the gates is generated whenever its two outputs are simultaneously logically true. The signal emanating from these AND gates is coupled via the associated OR gates 249 or 251 to the input of the function generator 87 (FIG. 9E). As hereinabove described the function generator comprises a full adder in combination with the carry flip flop EKCYF 88. As is hereinafter to be more fully described, the respective outputs of the adder are coupled to the input or write gate of the various recirculation or storage registers 81, 83, 85 and 93.

Referring now to FIG. 10 further structural and operational features of the control matrix 77 may be understood. FIGS. 10A and 10B illustrate a repertoire of micro instructions illustrative of those to be performed by line data processor 47 in normal operation. The first two columns of FIGS. 10A and 10B list the mnemonic and functional description of the micro instructions. The mnemonic and functional description of the micro instructions may be better understood by referring to the entries in FIGS.

10A and 10B along with the following definitions in Table III.

TABLE III

| Mnemonic: | Functional definition |
|---|---|
| AN4SI | Bit serially AND the information stored in the I register with the information stored in the S register. |
| CPYSI | Copy the contents of the S register to the I register. |
| DEC V | Decrement the contents of the V register by one and store result in the V register. |
| INC SI | Increment the contents of the S register by one and store result in I register. |
| JNZIN | Execute jump instruction when bit "N" of the I register is logically true. |
| LODVE | Load the contents of the V register into E memory at the designated address. |
| OR4SI | OR the contents of S register with the I register.[1] |
| AN4VI | AND the contents of V register with the contents of the I register.[1] |
| XO3SI | Perform EXCLUSIVE OR bit serially on the contents of the S register with the contents of the I register. |

[1] The results of these micro instructions are not returned to any register, however if the result of the indicated logical operation is a logical one, Flag UFOF is set; if the result is a logical zero, the flag UFOF is reset.

Referring again to FIGS. 10A and 10B, the entries under UUOF through UL7F comprise a variable length operation (OP) code for the various micro instructions. As illustrated the OP code may comprise a four to nine bit binary instruction and whenever a particular configuration is loaded into the U register 75 it is decoded by the control matrix 77 thereby generating the logic control level signals as indicated by the X's in the chart. In the case of a four bit OP code the contents of UU4F through UL3F may comprise any desired bit configuration for example the data to be transferred manipulated or compared in the indicated inter-register exchange. The last portion of the instruction register entry comprising the letter A is the address of the next micro instruction. For purposes of simplicity of illustration, a single address bit has been shown, however in the preferred embodiment the next address comprises a four or seven bit configuration. The four bit configuration designated by the letter A is sufficient to address the next micro instruction whenever such micro instruction is located within a predetermined field in the same track of the disk memory. Where it is necessary to store the next instruction outside the predetermined field, for example in another track of the memory, an additional three bits address designated S is employed.

Referring now to FIGS. 9F, 10A and 10B it may be seen that the outputs of the control matrix 77 correspond to the columnar headings of FIGS. 10A and 10B. The output from the control matrix 77 as hereinabove described energizes the designated input of AND gates 231 through 246 thereby permitting the energized AND gate or gates to couple information signals to the respective OR gates coupled thereto.

By decoding the micro instruction contained in the U register 75, the control matrix actuates the desired inputs to the function generator 87 and carry circuit flip flop EKCYF88. The two inputs to the function generator 87 are listed separately in FIGS. 10A and 10B as Input 1 and Input 2 respectively. If a single input to the generator is energized by the control matrix 77, the contents of the register associated with the activated AND gate, for example the S register, may be either transferred to or written into another register. Similarly energizing the two respective inputs to the function generator permits the contents of the respective registers, or a selected character thereof, to be manipulated bit by bit with the designated character of the other register. The manipulation may comprise the performance of an Exclusive OR or logical AND on the data stored in the respective registers. In either of these two operations, the transfer or comparison, the original register contents may be transferred to another register or restored to the original register by designating the restore control for a particular register.

As hereinabove described all interregister information transfers, except the automatic W register 101 to V register 81 which will hereinafter be described in conjunction with the datacomm transmit-controller, are accomplished via the function generator 87. Referring now to the input gating for the respective V, S, I and F registers 81, 83, 85 and 93, it may be seen that they essentially comprise a write input gate from the function generator and a recirculation gate input. As hereinabove described, the W, V and S registers are preferably recirculation registers (or recirculation loops) in which the output is continuously fed to the input whenever a gate associated with the write-in input, for example that connected to the K output signal from the function generator 87, is not energized. The outputs from the respective write and recirculate gates are coupled to the input of an OR gate 291 with the output thereof gate coupled to the input of the first stage of the register. Referring now to the V register 81, it may be seen that in addition to the normal write input from the function generator 87 and the recirculate gate, AND gates 271 and 273 shown in FIG. 9E provide a path from the output of the W and I registers respectively into the V loop 81. Similarly it may be seen that gates 275 and 277 provide direct write-in paths from the V loop and the buffer BBF to the input of the W loop 101.

As hereinabove described the S, V and W registers are preferably recirculation registers while the I and F registers are static shift registers. Since the logical control gating for the static and recirculation registers is essentially the same regardless of the number of inputs, the illustrative structure and operation of the S loop 83 will be explained in detail with the functionally equivalent gating of the other registers being correspondingly denominated. That is to say, a gate of another register which accomplishes the same or similar function as a denominated gate of the S loop carries the same numeric description plus the register identifying letter of the other register; e.g., gate 281V is the write-in gate of the V register. As shown AND gate 281 is the write gate for the S register 83 and gate 283 is the recirculation gate. Since it is desirable to disable or inhibit the output from recirculation AND gate 283 whenever the write-in gate of the S loop is activated, the logical control level for the gate 283 may be generated by monitoring the output of AND gate 285. Gate 285 couples the gating signals from the control matrix 77 and the timing pulse EXT, to determine the execution time and duration the write-in gate 285 is activated. As shown inverter 287 inverts the logic control level from gate 285 for the write gate 281 and applies it as a control level to the recirculate gate 283. In this manner the recirculate gate 283 is selectively disabled whenever the write-in gate 281 is enabled and conversely the recirculation gate is enabled whenever the write-in gate is disabled. Referring to the V and W loops (FIG. 9E) it may be seen that a similar inhibit gating configuration employs an OR gate 291 to monitor the logical control level for the write-in gates.

As hereinabove described in conjunction with FIG. 3, the line discipline processor 41 is able to execute its own program steps under control of its state machine and to respond to commands from the remote processor. Referring again to FIG. 9G it may be seen that the contents of the Q register, i.e. the micro instruction register of the remote processor 33 are coupled to the input of the state machine decoder 299 of the line discipline processor 41.

Thus by fetching one of a predetermined group of micro instructions hereinafter to be fully described in conjunction with Table IV, and placing it in the Q register, the remote processor is able to force the line discipline processor state machine 205 into a particular state in which various inter processor communications take place. As hereinabove described in conjunction with FIGS. 6A, 6B and 6C, by forcing the line discipline processor state machine 205 into either state E3 or E6 and by selectively setting the carry flip flop EKCYF, the inter processor machine state counter 301 of the line discipline processor is forced into one of its four states X0 through X3 (FIG. 6). As described in conjunction with FIG. 6C, information may be selectively transferred between the E and M memories via the R loop of the remote processor during states $X_1$ through $X_3$. Referring now to Table IV below, the contents of the Q register in the remote processor 33 may be related to a typical list of micro instructions for controlling the inter-processor transfer of information from various registers to and from the various memories.

change the machine state and to the input gate 277 (FIG. 9E) of the W loop to enable access to the W register. Similarly in the transmit mode, the bit and character counters 309 and 307 (FIG. 9E) together define the address of the characters to be read serially from the W register to the transmit buffer 311 and BBF buffer 313 to be coupled to the line for transmission to the central data processor.

In addition to defining the beginning address of the received data, the character counter further determines the number of received characters to be expected. The decoder circuits 379 and 381 (FIG. 9D respectively), coupled to the bit and character counters 309 and 307 monitor the contents or state of the respective counters. These decoder circuits, which may comprise a diode decoder or AND gate array, generate an appropriate output signal whenever its associated counter reaches predetermined counts. The decoders in conjunction with the counters define predetermined states of the counter, for example end of character and end of word states. Thus by defining the expected number of characters and by decrementing the respective counters in response to received or transmitted data, a running bit and character

TABLE IV

| Mnemonic | Function | Q Register |
|---|---|---|
| LOD ME | M to E | A A A A S S S I I 0 I I 0 I 0 I |
| LOD EM | E to M | A A A A S S S 0 I I I I 0 I 0 I |
| LOD ER | E to R | A A A A S S S 0 I I I 0 0 I 0 I |
| LOD RE | R to E | A A A A S S S I I 0 I 0 0 I 0 I |
| CPY BUU | B to UU | A A A A S S S I I 0 0 I 0 I 0 I |
| CPY BUL* | B to UL | A A A A I 0 I I 0 0 0 I 0 0 0 0 |
| EA | Idle 1—BD0F0—BD1F—BD3F | A A A A I 0 I 0 0 0 0 I 0 0 0 0 |
| CPY FB | F to B | A A A A 0 0 I 0 0 0 0 I 0 0 0 0 |
| ANIBF | BAF to F | A A A A 0 0 I I 0 0 0 I 0 0 0 0 |
| ORIBF | BVF to F | A A A A 0 I I I 0 0 0 I 0 0 0 0 |
| X⊕IBF | B⊕F to F | A A A A I I I I 0 0 0 I 0 0 0 0 |

*CPYBUL must only be ordered when line discipline processor is in idle states.

DATACOMM CONTROLLER

Referring now to FIGS. 9D and 9E the structure and operation of the datacomm controller 47 will now be explained. As hereinabove described the hierarchy of command control in the remote terminal 23 extends from the line discipline processor 41 to the datacomm controller 47. In accordance with this hierarchy of command, the I register 85 of the line discipline processor determines the specific number of characters expected to be received by the datacomm controller 47. Similarly the U register 75 of the line discipline processor determines the initial count of state machine counter 221 (FIG. 9D) of the datacomm controller. After the U register determines the state of the counter of the data controller state machine, the controller executes a proper state change sequence under control of its state machine as determined by the count of the state control counter and state transitions in response to existing logical and signal related signals.

In accordance with one aspect of the present invention, applicants' datacomm controller 47 comprises a programmable buffer storage. The received data is packed in the data buffer (W register) 101 in accordance with an address instruction determined by the character and bit counters 307 and 309 respectively (FIG. 9D). The count loaded into the character counter 307 is coupled to the input of serializer circuit 367. The serializer circuit converts the three bit character address (i.e. for eight characters per word) into a serial train for comparison with a basic address stream, for example the sector track address TARF. When the desired character is located, i.e. serialized stream and TARF are identical, the compare circuit 369 sets flip flop 371 thereby generating the found character signal YACF. After the desired character has been located in the W loop, the YACF signal initiates the bit search sequence in which the contents of the bit counter are compared in compare circuit 373 with a basic bit time defining stream CT. Upon detecting coincidence and reading or entry may commence. The FINDBIT signal is coupled to decoder 328 to appropriately count is maintained. In this manner when the respective counters reach a predetermined count, for example (1) character counter=7 is defined as DCC7; (2) character counter=0 is defined as DCC0; and (3) bit counter=7 is defined as end of character, appropriate logic signals are coupled to the input of decoder 328. In this manner by maintaining a running tally, the contents of the W register are automatically correlated with the expected number of characters, that is the character counter reaches zero when the expected numbers have been received. After the expected number of characters have been received, the information stored in the W loop 101 is automatically transferred to the loop 81 of line discipline processor.

In the preferred embodiment of applicants' invention, the datacomm controller 47 is coupled to a modem 25 (FIG. 1) which in turn is coupled to the input of the transmission channel 21. The structure and function of the modem 25, as is known to those skilled in the art, will be determined by the quality and type of transmission channel. In essence the datacomm controller transmits data in serial bit binary form to the modem in the transmit mode and receives serial bit binary data in the receive mode. In the preferred embodiment the code is a seven bit plus parity U.S. ASCII plus a start and stop bit. In the receive mode the start bit is detected and in conjunction with the rate switch 315 (FIG. 9E), which as shown is selectively settable for six hundred or twelve hundred baud, to determine the appropriate clock bit times. As shown the TX–RX clock is generated by an oscillator circuit 317 (FIG. 9D), for example a 19.2 kilohertz crystal oscillator which is coupled to an oscillator frequency divider counter 321. By dividing the basic oscillator frequency, the appropriate clock frequency DCL1F is derived for sampling data at the 600 or 1200 baud rate as determined by gates 322 and 323 (FIG. 9E).

In the receive mode, received data is temporarily stored, bit by bit, in the bit buffer BBF 313. The successive data bits stored in BBF are then serially strobed into the predetermined address location of the W register 101. Similarly in the transmit mode, data is serially read from the W register 101 to the transmit bit buffer 311. Data stored in the TX bit buffer 311 is strobed into the TX-RX buffer 313 for transmission to the output terminal 321. In both the receive and transmit mode of operation, parity flip flop DPF 327 (FIG. 9E) checks the bit parity as the information is transferred to or from the W register. As shown, the parity flip flop 327 is arranged to insert a parity bit into the transmit buffer 311 at the appropriate time during transmission of data.

As shown the clock DCLIF is coupled to the input of control gating decoder 328 (FIG. 9D) which in conjunction with the state machine counter 221 determines the machine state and transitions from state to state during the receive and transmit modes respectively. In the receive mode, the serial bit binary data is coupled from the receive terminal 333 (FIG. 9E) to the input of the receive-transmit buffer 313. In response to the detection of a start bit by gates 335 and 337, the clock frequency divider is appropriately synchronized thereby generating the clock or data-in strobe pulses for the receive mode. In the transmit mode, the clock is essentially free running as bit synchronization is done at the receive terminal.

The receive data is coupled in parallel to two line condition monitor circuits namely, a break detector 341 (FIG. 9E) and a line noise detector 343 (FIG. 9D). Referring first to the noise detector 343, the receive data terminal 333 is coupled to the inputs of two flip flops YAF and YBF in parallel. The flip flops YAF and YBF 345 and 347 respectively are arranged to be reset in opposite states by the control gating and control circuit 328. Noise on the channel could act as a normal input signal to change the state of flip flops 345 and 347. By determining or monitoring the state of YAF and YBF at particular predetermined times related to the normal clocking time, it is possible to detect the presence of noise in the communication channel which could be misinterpreted as valid information signals. As shown in the datacomm receive state diagram illustrated in FIG. 7A, if the state machine is in state Y5 waiting to sample data and the YAF signal is true, the state machine is returned to state Y4 to wait for a start bit. Thus noise is rejected or distinguished from true data signals.

The second line condition monitor type circuit comprises the break detector 341. As shown the break detector comprises a pair of AND gates 353 and 355 coupled via OR gate 357 to the input of a three-stage break counter 359. The contents of counter 359 are decoded by gate 361. If the counter 359 reaches a predetermined count this condition is recognized as an error or break on the line and EF6F and flip flop 396 are reset thereby terminating the transmit carrier from the modem. In essence the break detector comprises a first AND gate 353 for incrementing the counter in accordance with received data and timing pulses, and a second input gate 355 for resetting the counter at predetermined times. If the counter reaches a predetermined count, i.e. if it is not reset properly, this condition is recognized as an error and the appropriate flag register stage (EF6F) is reset by the error signal EF6FR/. The setting of the flag register enables the line discipline or remote processor to recognize this faulty line condition whenever it interrogates or monitors the flag register 93.

MESSAGE EXCHANGES

Referring now to FIGS. 11A through 11D, typical examples of message interchanges between the remote terminal 23 and the central processor 11 are illustrated. As hereinabove described applicant's remote terminal is capable of operating in either an off-line or an on-line mode. In the off-line mode, processing tasks are accomplished by the remote processor 33 in accordance with program and object data stored in its memory. In the on-line mode the remote processor 33 relies upon communications with the central processor for at least a portion of its operation. In the on-line mode, the remote terminal preferably operates in a poll and select environment. A poll is defined as a message by which the central data processor interrogates one of a plurality of remote terminals, for example in a predetermined sequence, and inquires whether the addressed remote processor has a message for transmission to the central data processor. Similarly a selection is defined as a message by which the central data processor interrogates one of a plurality of remote terminals in the net informing the addressed remote processor that it has a message ready for transmission to the addressed remote terminal.

In either the poll or select mode, if an addessed remote terminal is not ready to receive a message, i.e. if it is either being operated off-line or if it is otherwise not ready to receive or send a message, the line discipline processor automatically responds with an appropriate "not ready" message. As shown in FIGS. 11B and 11D the line discipline processor 41 responds to a poll with an EOT and to a select with an NAK to indicate that it is not ready to send or receive a message respectively. Upon receiving the negative acknowledgement from the addressed remote processor, the central data processor will either re-transmit its message, which may have been garbled in the channel, or it may continue on in its polling or selection sequence to the next remote terminal in its normal addressing sequence.

Referring again to FIGS. 11A through 11D it may be seen from the legend that the function is written above the signal indicating waveform-type line and the message format is indicated below the line. The message format includes reading left to right, characters 1, 2, 3 . . . N. The respective characters indicated are those of the United States of America Standard Code for Information Interchange (US ASCII).

Figure 11A:
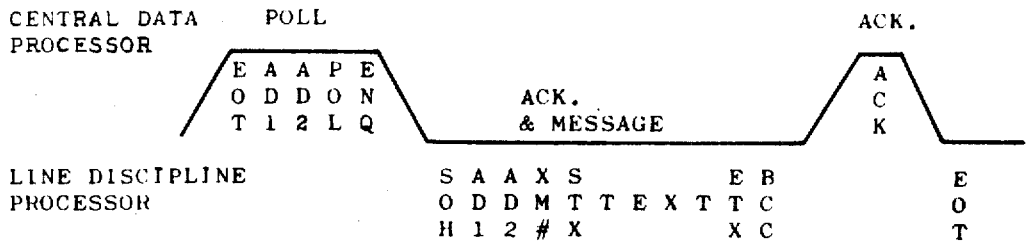
Figure 11B:
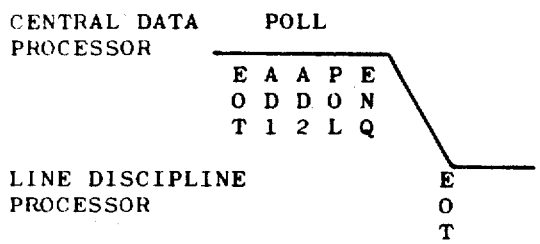

Referring now to FIG. 11A there is illustrated a message exchange for a typical poll operation. As illustrated the first character in the message transmitted by the central data processor comprises an end of transmission character EOT. In the preferred embodiment, all transmissions begin with this EOT character. Following the EOT character are two address characters AD1 and AD2. In a typical-terminal on-line environment, each remote terminal 23 would have assigned to it a plurality of address indicating characters which are stored in the memory of the line discipline processor 41. Following the address characters are the poll POL and enquiry ENQ characters. From FIGS. 11C and 11D it may be seen that a similar message from the central data processor is assembled and transmitted for the selection-type enquiry with the SEL character replacing the POL character of the format in FIGS. 11A and 11B.

As hereinabove described, when an operator at a remote terminal desires to communicate with the central data processor 11, an appropriate message or character is entered into the remote processor, for example via the keyboard, to initiate the message assembly micro program subroutine. Additionally as hereinabove described, during the normal program sequence the remote processor 33 periodically monitors the contents of the flag register 93. The remote processor 33 monitors the contents of the flag register 93 by energizing gate 387 (FIG. 9D) thereby shifting the contents of the normally static flag register through the EFOF stage. As hereinabove described, the basic clock timing for the terminal 23 is preferably determined by a clock pulse source associated with the remote processor 33. While the clock or timing pulse sources for the line discipline processor 41 and datacomm controller 47 are preferable a function of the basic clock timing of the remote processor 33, they need not necessarily be in phase. Accordingly, as shown, the inputs to AND gate 387 comprise a remote processor executive timing pulse QEXT, and an F to B register information exchange micro-instruction logic signal UBF. The interregister information exchange micro instruction UBF would be true, for example, for any of the micro instructions listed in Table IV which involve an F to B transfer. By energizing gate 389 (FIG. 9A) which is operatively coupled to the input of selection network 60 of the remote processor, the contents of the flag register are shifted into the B register 65. By comparing the contents of the B register with condition indicating information previously loaded into another of the registers of the remote processor, for example the A register, the remote processor by detecting a match condition determines the state of the line discipline processor 41 and the datacomm controller 47.

In response to the initiation of the message assembly micro program, the text of the message to be transmitted to the central processor is entered, for example from the keyboard, and assembled in a particular memory location of the M memory 34. When the message text to be transmitted is assembled, the remote processor then withdraws the apropriate micro instruction (Table IV) to force the remote and line discipline processor into the appropriate machine state in which information assembled in the M memory is transferred to the send buffer of the E memory. With the message assembled in the send buffer of the E memory, the remote processor 33 is free to resume its normal, off-time task processing function while the line discipline processor 41 awaits a poll message from the central data processor.

Upon recognizing a message ready condition flag (FIG. 12), the line discipline processor 41 executes a micro instruction to copy that appropriate information from the U register 75 to the state machine counter 221 of the datacomm controller to put the datacomm controller in the receive mode. As shown in the receive state diagram illustrated in FIG. 7A, in the receive mode the datacomm controller awaits the receipt of a start bit. At the same time the line discipline processor 41 via the I register 85 loads the character counter 307 with a count corresponding to the expected number of characters to be received. As shown in FIG. 11 the poll and select message from the central data processor comprise a five character format and thus the character counter 307 of the datacomm controller 47 is preferably set to the number five.

In response to the receipt of the start bit of the first character, the clock counter 321 is enabled thereby generating the appropriate data-in strobe clock pulses DCL1F. The received data is coupled from the receive terminal 333 into the bit buffer 313. Each bit serially received is then packed into the W register 101 at the character and bit location determined by the bit and character counters 309 and 307 respectively. As the respective bits and characters are received, the bit and character counters are decremented thereby keeping a running tally of the received character versus the expected number of received characters. Whenever the last character expected has been received, the contents of the W register 101 are automatically transferred to the V register 81 via gate 273 and the appropriate flag register stage EF5F is set by the decoder 328 when the machine state made the transition from state Y10 to Y2 (FIG. 7A).

The setting of the receive flag EF5F signals the condition that a message has been received and assembled in the V loop. Thereafter this condition is recognized when the line discipline processor scans the flag register to determine if flags have been set. As hereinabove described, a continual parity check is run on received characters by parity flip flop DPF 327 of the datacomm controller 47. In the event no parity error has been detected, the parity error flag EF7F is not set. If the message has been properly received, i.e. the parity flag is not set, the line discipline processor then examines the received message to determine whether it is addressed to that particular remote terminal. This message examination is preferably done by comparing the contents of the received message stored in the V register 81 with message type information previously loaded into the S register 83. Such information previously loaded into the S register would comprise the address of that remote terminal and the various message enquiring formats. By serially comparing, for example Exclusive ORing, the received text with the stored information including the address and various types of message enquiry formats, the line discipline processor is able to determine whether the received message is for it and what type message has been received. As shown in FIG. 12, stage EFOF of the flag register is employed to store the result of this type of a comparison operation by the function generator 87. By monitoring the state of the EFOF flip flop of the flag register 93, the line discipline processor is able to determine when a true comparison has been made and thereby identifying the message address and, if addressed to it, the type of enquire message.

After the line discipline processor 41 has determined that the received message is for it and that parity has checked properly, it initiates a micro program step to place the datacomm controller 47 in the transmit mode. If the addressed line discipline processor is ready to receive a message in response to a selection (SEL) from the central data processor, the line discipline processor withdraws from memory or generates an acknowledge ACK character and transfers it to the V loop for further transfer to the W loop. Whenever the V loaded flag EF5F is true or set, the ACK character or message would be loaded into the W loop for transmission to the central data processor.

Figure 11C:
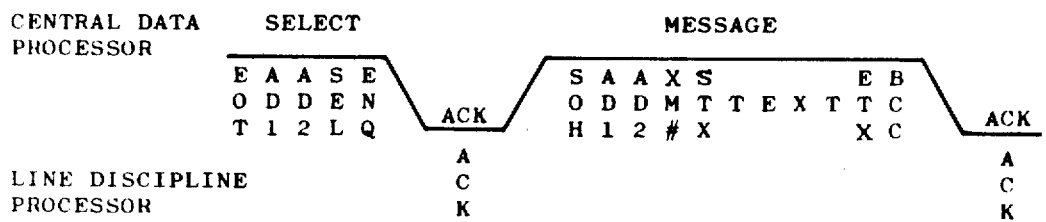
Figure 11D:
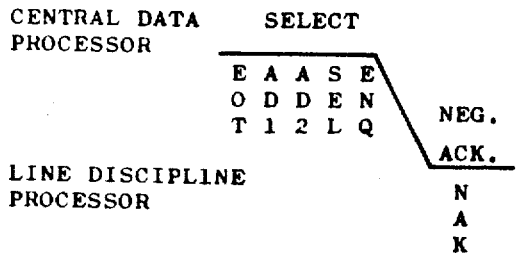

In response to the proper reception of an ACK message, the central data processor as shown in FIG. 11C transmits the message. The datacomm controller 47 at each remote terminal then packs the received message as shown in 11C in the W loop in accordance with the bit and character address instructions loaded from the I register. As the number of expected characters is unknown the counter at the previously addressed terminal would be set preferably to eight, i.e. the character capacity of the W loop. Thereafter as the message including the header would be packed in the W loop in accordance with the continuously decremented count of the bit and character counter. When the capacity of the W register is reached, i.e. eight characters have been received, the contents of the W loop would automatically be transferred to the V loop thereby enabling the V loaded flag. Thereafter the W loop is reset and ready to receive the additional characters of the message. At the addressed terminal the V loaded flag signals the line discipline processor that eight characters have been received and the line discipline processor upon recognizing the flag (FIG. 12) executes a micro program to dump the contents of the V register into the receive tank of the E memory.

After the entire message had been received and transferred in groups of eight characters to the E memory via the V loop, the parity of the received text is checked and if properly received, the datacomm controller would be returned to the transmit mode to transmit an acknowledge character ACK to the central data processor. In the event an error had been received, a negative acknowledgement NAK would be sent and the central data processor would re-transmit the message, for example a given number of times or until it was properly received. After the received message had been checked for example for character bit and longitudinal parity the message text, i.e. the received message minus the header, end of text and block check character BCC would be loaded in the receive tank of the E memory and EF2F of the flag register would be set indicating that the line discipline processor 41 has a received message ready for transmission to the remote processor 33. As hereinabove described the remote processor periodically monitors the contents of the flag register 93 and upon determining that the line discipline processor has a message for it, processor 33 interrupts its program and initiates the appropriate E to M transfer (Table IV) thereby receiving the message text transmitted from the central data processor.

Referring now to FIG. 11 in conjunction with FIG. 12, the poll operation of the remote terminal will be explained. As hereinabove stated the message to be transmitted to the central data processor is assembled in the M memory of the remote processor 33 and transferred to the E memory of the line discipline processor 41. In the preferred embodiment, the header and block check characters are not included in the text of the message assembled by the remote processor. Thus the header characters SOH, AD1, AD2, etc. and the end of text ETX and BCC in the preferred embodiment are stored or generated by the line discipline processor and added to the message text prior to transmission.

After a poll message has been properly received and identified, i.e. by the interregister comparison as hereinabove described, the line discipline processor in response to the recognizing transmit ready flag (FIG. 12) executes the appropriate micro instruction to place the datacomm controller 47 in the transmit mode. Thereafter the message text stored in the E memory is transferred a word at a time to the V loop for further transfer to the W loop. The appropriate header information, for example which is stored in a separate location in memory, would be withdrawn and inserted in the proper sequence to assemble the entire message. The setting of the V loaded flag in response to the tarnsfer of the information from the E memory to the V loop enables the datacomm controller to initiate the transfer of the information word stored in the V register to the W loop and initiate the transmit mode. In the transmit mode, EF6F (FIG. 12) sets the carrier flip flop 396 DTCF and the information stored in the W loop is withdrawn a bit at a time and transferred via the transmit buffer 311 and receive-transmit buffer 313 to the data transmit terminal 321. In the transmit mode the datacomm controller state machine executes the various state transitions as illustrated in FIG. 7B thereby serially transmitting the information in bit serial form.

Depending upon the length of the message to be transmitted i.e. the text plus the header and other parity control characters, the message is transferred a word at a time from the E memory to the V loop and thence to the W loop for transmision. If it is desired to generate a block check character (BCC) for the mesage, this operation is preferably accomplished serially in partial steps as each word is transferred from the E memory to the V loop. For example the block check character, which is not a unique character but is the mod two sum of the individual characters bits of the message, is generated by accumulating the partial parity i.e. the mod two sum of the binary ones of all previously transferred characters of the message. As each successive eight character word is tarnsferred from the E memory to the V loop, it may be added to the previously generated partial parity bit thereby updating the partial parity count. After the last word has been transferred from the E memory to the V loop and the block check character has been completely assembled i.e. the partial parity count has been updated in light of the characters contained in the last word, the block check character (BCC) may be transferred to the V loop, for example by interregister transfer hereinabove described. In this manner the block check character (BCC) is appended if desired to the message text thereby completing the assembly of the message to be transmitted to the central data processor.

After the last portion of the message has been transferred from the V loop to the W loop for normal processing in the transmit mode by the datacomm controller, the recognition of the ETX or end of text character, for example by interregister compare operations as hereinabove described, results in the setting of the micro program instruction which terminates the transmit mode. After termination of the transmit mode the line discipline processor readies the datacomm controller, i.e. puts it in the receive mode to await the receipt of an acknowledge ACK character indicating that the central data processor has properly received the transmitted message. In the event the message was not properly received by the central data processor, i.e. due to a noisy channel or other factors, the central data processor would send a negative acknowledgement NAK to the line discipline processor. Upon receiving and identifying the negative acknowledge signal, the line discipline processor preferably initiates the retransmission of the message retained in the E memory a predetermined number of times or until the message is properly received. In response to an ACK from the central processor, the line discipline processor transmits an end of transmission (EOT) character and thereafter return under instruction from the line discipline processor to the receive mode to await the next message from the central data processor.

Referring again to FIG. 12 the description and function of the various stages of the flag register may better be understood. As hereinabove described the various stages of the flag register are selectively set and reset by hardware and/or software (program instructions) functions to indicate the occurrence or termination of predetermined conditions in the remote terminal. The state of the flag register is periodically monitored by the remote processor 33 and line discipline processor 41 to determine the occurrence of various predetermined states or conditions in the respective processors. As shown, the flags EF1F, EF2F and EF3F are primarily employed for inter-processor data transfer. Similarly the flags EF4F, EF5F, EF6F and EF7F are employed for line discipline processor and datacomm controller information interchange and control. With reference to the respective flag conditions set by hardware and/or software, while they are effective in the normal operation of the remote processor, the program of the remote processor or line discipline processor may be modified or designated to selectively ignore all or designated flags. For example when data is to be transmitted without a character parity bit, the line discipline processor may be programmed to reset the parity flag EF7F. Similarly when the remote processor is operated off-line, the various inter-processor flags EF1F through EF3F while set in response to predetermined conditions may be ignored while the processor remains in the off-line operating mode.

While in the foregoing there is disclosed particular embodiments of the various operating elements of applicants' remote terminal it is to be understood that these are illustrative and that the principles of applicants' invention may be applied in conjunction with other apparatus. For example while the remote processor, line discipline processor and datacomm controller have been illustrated and described as operational elements of a composite terminal computer, either the datacomm controller or the line discipline processor and datacomm controller may be separated or combined into an information exchange unit which is remote from but functionally cooperable with the remote processor to accomplish the same or similar data transmission associated functions. Further the structure and operation of the various electronic and logic circuits incorporated in the foregoing disclosure may be replaced with logical and/or functional equivalents by those skilled in the art. In light of the foregoing disclosure it will be apparent to those skilled in the art that many variations, changes, substitutions and other departures from the disclosed illustrative embodiments may be made without departing from the scope of applicants' invention which is described with particularity in the appended claims.

What is claimed is:

1. A terminal computer capable of operating on-line with a central data processor to transmit data to or receive data from said central processor, said terminal computer comprising a data processor including:

memory means for storing object data, program instructions and messages to be transmitted to said central processor, an arithmetic unit, means for selectively withdrawing program instructions from said memory means in a programmable order, and control means responsive to program instructions withdrawn from said memory for controlling the operation of said arithmetic unit to manipulate object data in accordance with withdrawn program instructions, a line discipline processor including:

storage means for temporarily storing program instructions and data to be transferred or received from said central processor for said arithmetic unit, control means for executing program instructions withdrawn from said storage means in a programmable order, and flag register means for storing a group of operating condition indicating signals including the availability of promptly received data for transmission from or to said discipline processor and said data processor, and gating means for selectively coupling the memory means of said data processor to said storage means of said line discipline processor, and data communication controller means including:

buffer register means for storing data received from or to be transmitted to the central data processor, gating means for selectively coupling the storage means of said line discipline processor to the buffer register means of said controller means, and buffer memory allocation means for allocating portions of said buffer register means at which data received from central processor is to be stored or from which data to be transmitted to the central processor is to be withdrawn, said buffer memory allocation means being responsive to control signals from said line discipline processor.

2. The terminal computer defined in claim 1 wherein said memory means of said data processor and said storage means of said line discipline processor comprise respectively first and second separately addressable sections of a common rotatably mounted magnetic data storage device and wherein means is provided for selectively inhibiting access by said line discipline processor to said sections of said magnetic storage device.

3. A terminal computer operable on-line with a central data processor in a poll-selection environment whereby data may be transferred to or received from said central data processor by said terminal computer, said terminal computer comprising a data processor including:

memory means for storing object data, micro program instructions and the text of messages to be transmitted to or received from the central data processor, input means for entering data and program instructions, an arithmetic unit, means for selectively withdrawing program instructions from said memory means in a programmable order, a plurality of recirculating register means cooperable with said arithmetic unit for manipulating data in accordance with program instructions withdrawn from said memory means, a line discipline processor including:

memory means for storing object data and a series of micro program instructions, a logical function unit, control means for selectively withdrawing program instructions from said memory means, a plurality of register means cooperable with said logical function unit for manipulating data in accordance with program instructions, and flag register means for storing signals individually indicative of a predetermined group of line discipline processor operating conditions, gating means for selectively transferring the contents of said flag register to one of said recirculation register means of said data processor, and a datacomm controller including:

means for operably coupling said terminal computer to a data transmission channel addressable data storage buffer register means for temporarily storing data to be transmitted to or received from the data transmission channel, data clocking means for sampling data into or out of said data storage buffer register means, and address allocating means responsive to control signals from said line discipline processor for determining the address in said buffer register means at which data is to be temporarily stored or from which data is to be withdrawn.

4. The computer defined in claim 3 wherein said address allocating means includes:

a bit counter, a presettable character counter, gating means responsive to commands from said line discipline processor for presetting said character counter, and gating means for automatically transferring received data from said buffer register means to one of said register means of said line discipline processor upon receipt of a predetermined length of message, said predetermined length being variably defined within predetermined limits by the presetting of said character counter.

5. The computer defined in claim 3 additionally including means in said line discipline processor for recognizing and responding to poll and selection message enquiries from said central data processor.

6. The terminal computer defined in claim 5 additionally including:

means in said line discipline processor for appending message header characters to the text of messages to be transmitted to said central data processor, and means for generating and selectively inserting parity characters as said text of said message to be transmitted to said central data processor is transferred from said storage means to said buffer register means of said controller.

7. The computer defined in claim 3 wherein said logical function unit comprises a full adder and multiple input selection means for selectively coupling input signals from ones of said plurality of register means to a first and a second input terminal of said full adder and wherein said register means are cooperable with said adder for performing logical AND, OR and Exclusive OR logical functions on data stored in ones of said register means selectively coupled to the input terminals of said input selection unit.

8. An on-line data communication system including a central data processor, a plurality of addressable remote autonomous data processors, each remote processor including a memory, an arithmetic unit and an information exchange control means for controlling information exchanges between said central data processor and individual ones of said remote processors, said information exchange means comprising:

a line discipline processor including, storage means for storing program instructions and the text of messages to be transmitted to the central processor or received from said central processor,
means for withdrawing and executing program instructions,
a multiple input logical function unit for performing logical data manipulation functions on streams of data received by respective ones of the inputs of said logical function unit,
register means for storing data,
control means for selectively intercoupling said logical function unit and said register means for accomplishing a desired logical function on data stored in said register means,
transfer gating means for intercoupling said memory of one of said remote processors and said storage means, and
flag register means for storing and indicating operating condition signals, said signals including the occurrence of one of a group of predetermined operating or error conditions of said line discipline processor, and
a datacomm controller including,
- a bit buffer for temporarily storing serially rereceived bits of data,
- buffer storage register means for storing a predetermined number of received data characters,
- clock means for strobing received data bits from said bit buffer into said buffer storage register means, and
- memory allocation means including a bit counter and a selectively character counter, said character counter being responsive to commands from said line discipline processor for determining the memory address in said buffer storage register means at which received data is to be packed.

9. The information exchange means defined in claim 8 additionally including:
means for decrementing the respective count of said character counter in responsive to received data,
decoder means for monitoring the count of said character counter, and
gating means responsive to said decoder means for automatically transferring the contents of said buffer storage register means to said register means when said count of said character counter reaches a predetermined count value.

10. The information exchange control means defined in claim 9 wherein said predetermined value is determined by the count selectively set in said character counter by said line discipline counter.

11. An on-line data processing system including, in combination,
a central data processor,
a plurality of independently operable addressable remote data processors each having data storage means, and
an information exchange means individually associated with each such remote data processor for controlling information exchange between the same and said central data processor, said communication exchange means comprising:
a datacomm controller, said controll including buffer storage means for storing up to a predetermined number of received characters, each character including a predetermined number of binary bits,
memory allocation means including a counter for determining a beginning address of said buffer storage means at which received data is to be stored,
means for modifying the count of said counter of said memory allocation means in responsive to received data,
decoder means for monitoring the count of said counter of said memory allocation means,
clock means for strobing received data into said buffer storage means, and a stored program line discipline processor including:
memory means for storing program instructions and object data,
control means for withdrawing and executing said program instructions,
a plurality of data manipulation registers,
data manipulation means including an adder for selectively performing logical AND and OR operations on data stored in selected ones of said data manipulation registers,
means responsive to said decoder means for transferring the information stored in said buffer storage means of said datacomm controller to one of said data manipulation registers,
gating means for transferring information from a selected one of said data manipulation registers to said memory means,
flag register means for alerting its associated remote processors that the line discipline processor has properly received a message, and
transfer means responsive to a command from said associated remote processor for transferring said received message from said memory means to the data storage means of its associated remote processor.

12. The information exchange means defined in claim 11 wherein the line discipline processor additionally includes,
means for storing a remote processor address word, said address word uniquely characterizing the remote processor operatively associated with said line discipline processor,
means for selectively withdrawing said stored address word and for loading said address word into one of said data manipulation registers,
comparison means including said adder for comparing said address word with at least a portion of the text of a received message to determine if said received message is addressed to the remote processor associated with said line discipline processor, and
means for setting at least one stage of said flag register means in response to a detected comparison between said address word and a portion of said received message.

13. A terminal computer capable of operating on-line with a central data processor for transmitting data to or receiving data from said central data processor, each message transmitted from said central data processor to said terminal computer including an address word and a message enquiry-type word, said terminal computer comprising
a datacomm controller, said controller including:
buffer register means for temporarily storing data received from or to be transmitted to said central data processor, and
address allocation means for determining the beginning address of said buffer register means from which data is to be withdrawn for transmission or to which received data is to be stored,
a stored program line discipline processor, said line discipline processor including:
storage means for storing program instructions, the text of messages, remote processor identifying address words and message enquiry type identifying words,
a plurality of data manipulation storage registers,
a logical function generator including an adder,
gating means for selectively intercoupling said buffer register means and at least one of said plurality of data manipulation storage registers to exchange data therebetween, and
means including at least two of said data manipulation storage registers and said function generator for comparing portions of a message text with address words and message enquiry-type words withdrawn from said storage means to determine whether the message is addressed to that terminal and what type message it comprises, a remote data processor, said remote processor including:
- memory means for storing programmable instructions, the text of messages and object data,
- an arithmetic unit,
- means for withdrawing and executing program instructions stored in said memory means,
- operator responsive means for initiating the assembly in said memory means of a text of a message to be transmitted to said central processor,
- receive gating means for selectively intercoupling the output of said storage means of said line discipline processor to the input of said memory means of said remote processor for transferring a received message assembled and edited by the line discipline processor to said remote processor, and
- transmit gating means for selectively intercoupling the output of said memory means of said remote processor to the input of said storage means for transferring an assembled message from said memory means of said remote processor to said storage means of said line discipline processor.

14. The terminal computer defined in claim 13 wherein said line discipline processor additionally includes:
- flag register means for signalling the occurrence of one of a group of predetermined operating and error conditions, and wherein said remote processor additionally includes
- means for periodically interrogating the flag register means to determine the occurrence of any of said predetermined conditions and to identify such conditions which have occurred.

15. A terminal computer capable of operating on-line with a central data processor for transmitting data to or receiving data from said central data processor, said terminal computer comprising a datacomm controller, said controller including:
- buffer register means for temporarily storing data received from or to be transmitted to said central data processor,
- address allocation means for determining the beginning address of said buffer register means from which data is to be withdrawn for transmission or to which receive data is to be stored, and
- means including a presettable counter for determining the operating mode of said datacomm controller, a stored program line discipline processor, said line discipline processor including:
- storage means for storing program instruction, the text of messages to be transmitted to or received from said central data processor, terminal identifying address words and message enquiry-type identifying words,
- a plurality of data manipulation storage registers.
- gating means for selectively intercoupling said buffer register means and at least one of said plurality of data manipulations storage registers for exchanging data therebetween,
- means responsive to decoded program instructions for presetting said presettable counter, and
- means for comparing portions of a message text with said terminal address words and message enquiry-type identifying words withdrawn from said storage means for determining whether the message is addressed to that terminal and what enquiry-type message it comprises, and a remote data processor, said remote processor including:
- memory means for storing program instructions, object data and the text of messages to be transmitted to or received from said central processor,
- an arithmetic unit,
- means for withdrawing and executing program instructions,
- operator responsive means for initiating the assembly in said memory means of a text of a message to be transmitted to said central processor,
- receive gating means of selectively intercoupling the output of said storage means of said line discipline processor to the input of said memory means of said remote processor for transferring a message received, edited and assembled by said line discipline processor to the remote processor, and
- transmit gating means for selectively intercoupling the output of said memory means of said remote processor to the input of said storage means for transferring the assembled message text from said memory means of said remote processor to said storage means of said line discipline processor.

16. A method of transferring information on-line between a central data processor site and individual ones of a plurality of selectively addressable remote data terminals comprising the steps of:
- assembling an inquiry message at the central data processor site, said inquiry message format including a beginning character, at least one remote terminal address character for identifying the remote terminal for which an inquiry message is specifically intended, at least one message inquiry type identifying character and an end of message character,
- transmitting said inquiry message from said processor site substantially simultaneously to said plurality of remote data terminals in a multidrop mode via a communication link coupling said remote data terminals to said processor site,
- receiving said inquiry message substantially simultaenously at said plurality of remote data terminals,
- storing said received inquiry message at each remote data terminal in said inquiry message format,
- withdrawing from addressable memory storage at each of said individual remote data terminals prerecorded expected message inquiry characterizing data,
- logically comparing said received inquiry message with said withdrawn expected message inquiry characterizing data at each of said plurality of remote date terminals to identify the message type and to determine whether said inquiry message is addressed to the respective receiving terminal,
- generating at the addressed remote data terminal if the inquiry message is proper as determined by the outcome of said logical comparison step an acknowledge response message, and
- transmitting said acknowledge message from the addressed remote data terminal to said central processor site to indicate that the addressed terminal has received the inquiry message and is ready to respond in accordance therewith.

17. A method of transferring information on-line between a central data processor and individual ones of a plurality of addressable remote data terminals coupled to said central data processor via a communication link coupling said remote data terminals to said central processor, said method comprising the steps of:
- transmitting from said central data processor substantially simultaneously to said plurality of remote data terminals an inquiry message, said inquiry message serially including an inquiry message beginning character, at least one remote terminal address character, at least one inquiry message-type classifying character and an end of inquiry message character, storing in a circulating memory at each remote data terminal said inquiry message received substantially simultaneously at individual ones of said plurality of remote data terminals, addressing and selectively withdrawing from memory storage at each of said remote data terminals prerecorded expected-inquiry identifying message data including an inquiry message beginning character, an end of inquiry message character and a plurality of inquiry message-type classifying characters, logically comparing portions of said received inquiry message with portions of said withdrawn expected inquiry message data, identifying particular characters of said received inquiry message by recognizing when a comparison match exists between individual ones of the characters of said received inquiry message and a character of said expected-inquiry message, comparing said at least one address character of said received inquiry message with a prerecorded remote terminal address stored at each remote data terminal, and transmitting to said central processor site from the addressed remote terminal a response message to indicate the operational status of the addressed remote terminal regarding said inquiry message.

18. A method of controlling data transmission on-line between a central data processor site and individual ones of a plurality of selectively addressable remote data terminals coupled to said central data processor site via a communication link coupling said remote data terminals to said processor site, said method comprising the steps of:

transmitting periodically from said central data processor site via said communication link to said plurality of remote data terminals an inquiry message, said inquiry message including a begin transmission character, at least one remote terminal address character, at least one inquiry message-type identifying character and an end of inquiry message character, receiving and storing said inquiry message at said plurality of remote data terminals, logically processing said inquiry message individually at each remote terminal for determining whether the inquiry message as received is in proper form and whether said inquiry message is addressed to the receiving remote data terminal, determining the state of readiness at the addressed remote data terminal for handling said received inquiry message, and responding to said inquiry message by transmitting an acknowledge message from the addressed remote data terminal to said central processor if said addressed remote data terminal is ready to respond to said inquiry message or transmitting a negative acknowledgment message from the addressed remote data terminal to said central processor in the event said addressed remote data terminal is not prepared to respond to said inquiry message.

19. A method of controlling the transfer of data and information on line between a central data processor site and individual ones of a group of selectively addressable remote data processor sites, said method comprising the steps of:

transmitting time sequenced poll or select inquiry messages from said central processor site to said plurality of remote data processor sites in a multi-drop mode via a communication link coupling said remote processor sites to said central processor site, receiving and at least temporarily storing said respective inquiry messages individually at each of said remote processor sites without interrupting the operating status of the individual ones of said remote data processors, establishing communication link discipline at each remote processor site by editing and arranging the code characters of all messages to be transmitted from individual ones of said plurality of remote processors to said central processor and by logically processing said received inquiry messages at each remote processor site to determine if a received message is correct in form and addressed to the receiving remote processor terminal site, and signaling the remote processor at the respective remote procesor site to which a message is addressed without interrupting the operational status of the remote processor when a properly received message has been received and edited and is ready for use by said remote processor.

References Cited

UNITED STATES PATENTS

| | | | |
|---|---|---|---|
| 3,202,972 | 8/1965 | Stafford et al. | 340—172.5 |
| 3,245,045 | 4/1966 | Randlev | 340—172.5 |
| 3,266,023 | 8/1966 | Werme | 340—172.5 |
| 3,407,387 | 10/1968 | Looschen et al. | 340—172.5X |
| 3,462,741 | 8/1969 | Bush et al. | 340—172.5 |

PAUL J. HENON, Primary Examiner

H. E. SPRINGBORN, Assistant Examiner

PO-1050
(5/69)

UNITED STATES PATENT OFFICE
CERTIFICATE OF CORRECTION

Patent No. 3,564,509          Dated February 16, 1971

Inventor(s) Cornelius C. Perkins et al

It is certified that error appears in the above-identified patent and that said Letters Patent are hereby corrected as shown below:

```
Col.  5, line 29, change "withdrawn" to --withdraw--.
Col.  9, line 30, change "accomplished" to --accomplish--.
Col. 13, line 10, change "wtihdraws" to --withdraws--;
         line 63, change "discripline" to --discipline--.
Col. 17,          after "coincidence" in line 74 and before
                  "and" in line 75, insert --compare circuit
                  373 generates a FINDBIT output signal
                  indicating the desired character and bit
                  have   been located--.
Col. 18, line 49, before "loop" insert --V--.
Col. 20, lines 42 change "typical-terminal" to --typical
         and 43,  multi-terminal--;
         line 72, change "executive" to --execute--.
Col. 21, line 18, change "apropriate" to --appropriate--;
         line 24, change "off-time" to --off-line--.
Col. 23, line 26, change "tarnsfer" to --transfer--;
         line 42, change "transmision" to --transmission--;
         line 43, change "mesage" to --message--;
         line 51, change "tarnsferred" to --transferred--.
Col. 27, line 62, change "controll" to --controller--.
Col. 30, line 50, change "date" to --data--.
```

Signed and sealed this 10th day of August 1971.

(SEAL)
Attest:

EDWARD M. FLETCHER, JR.          WILLIAM E. SCHUYLER, JR.
Attesting Officer                  Commissioner of Patents